(12) United States Patent  (10) Patent No.: US 8,520,196 B2
Hirai et al.  (45) Date of Patent: Aug. 27, 2013

(54) OPTICAL COMMUNICATION MODULE AND OPTICAL FIBER COMMUNICATION SYSTEM

(75) Inventors: Riu Hirai, Tokyo (JP); Nobuhiko Kikuchi, Tokyo (JP); Tetsuya Uda, Yokohama (JP); Shinya Sasaki, Koganei (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/363,883

(22) Filed: Feb. 1, 2012

(65) Prior Publication Data
US 2012/0224168 A1 Sep. 6, 2012

(30) Foreign Application Priority Data
Mar. 3, 2011 (JP) .................................. 2011-046909

(51) Int. Cl.
*G01N 21/00* (2006.01)
(52) U.S. Cl.
USPC .......................................................... 356/73.1
(58) Field of Classification Search
USPC .......................................................... 356/73.1
See application file for complete search history.

(56) References Cited

U.S. PATENT DOCUMENTS

2008/0232798 A1* 9/2008 Kasezawa .................... 398/34
2009/0245786 A1* 10/2009 Sakamoto .................... 398/28

FOREIGN PATENT DOCUMENTS

JP  2003-264509 A  9/2003

* cited by examiner

*Primary Examiner* — Tu Nguyen
(74) *Attorney, Agent, or Firm* — Mattingly & Malur, PC

(57) ABSTRACT

Bending of an optical fiber where a heat may be generated by a high output power can be detected without using a dedicated light source. An optical communication module that outputs a continuous wave light generated by at least one light source to an optical fiber transmission line, includes: (1) a loss measurement unit that measures a loss of an amplified spontaneous emission generated by allowing the continuous wave light output from the light source to create stimulated Raman scattering in the optical fiber transmission line; (2) a fiber abnormality analyzer that detects the abnormal state of the optical fiber transmission line on the basis of loss information on the ASE measured by the loss measurement unit; and (3) a light source controller that controls a supply state of the continuous wave light from the light source on the basis of the detection of the fiber abnormality analyzer.

19 Claims, 18 Drawing Sheets

PRIOR ART

PRIOR ART

PRIOR ART

OPTICAL SPECTRUM WITHOUT FIBER BENDING

OPTICAL SPECTRUM WITH FIBER BENDING

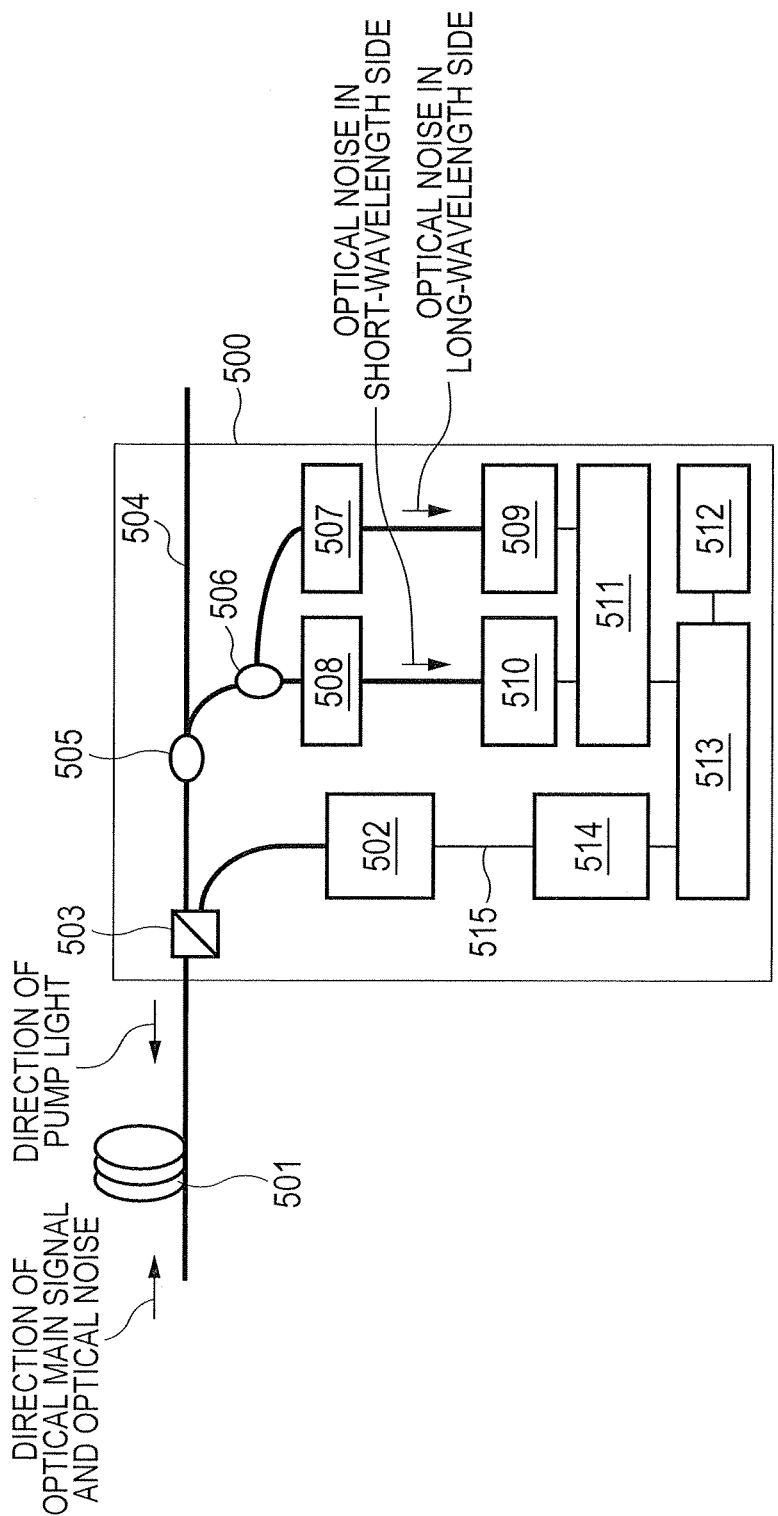

| | SMF | DSF | LEAF | TrueWave | |
|---|---|---|---|---|---|
| $\Delta_1$ | $\phi_{S1}$ | $\phi_{D1}$ | $\phi_{L1}$ | $\phi_{T1}$ | |
| $\Delta_2$ | $\phi_{S2}$ | $\phi_{D2}$ | $\phi_{L2}$ | $\phi_{T2}$ | |
| $\Delta_3$ | $\phi_{S3}$ | $\phi_{D3}$ | $\phi_{L3}$ | $\phi_{T3}$ | |
| $\Delta_4$ | $\phi_{S4}$ | $\phi_{D4}$ | $\phi_{L4}$ | $\phi_{T4}$ | |
| $\Delta_5$ | $\phi_{S5}$ | $\phi_{D5}$ | $\phi_{L5}$ | $\phi_{T5}$ | |
| $\Delta_6$ | $\phi_{S6}$ | $\phi_{D6}$ | $\phi_{L6}$ | $\phi_{T6}$ | |

$\Delta$: LOSS DIFFERENCE
$\phi$: RADIUS OF CURVATURE

OPTICAL COMMUNICATION MODULE AND OPTICAL FIBER COMMUNICATION SYSTEM

CLAIM OF PRIORITY

The present application claims priority from Japanese patent application JP 2011-046909 filed on Mar. 3, 2011, the content of which is hereby incorporated by reference into this application.

FIELD OF THE INVENTION

The present invention relates to an optical fiber communication system and an optical communication module configuring the system. The present invention relates particularly to a detection technique of optical fiber fault, and more particularly to a detection technique of optical fiber bending.

BACKGROUND OF THE INVENTION

In recent years, with the inventions and marketing of optical amplifiers (EDFA: Erbium Doped Fiber Amplifier), a required OSNR (optical signal noise ratio) has been remarkably relaxed. With this situation, a super high speed optical transmission in which a transmission capacity of one wavelength exceeds 10 Gbit/s has been put into practical use, and globally introduced. Further, the costs are further reduced with the use of the broadband of the optical amplifier (that is, by introduction of linear repeaters that can amplify a given wavelength band together).

Among the linear repeaters, attention has been paid to an optical Raman amplifier (also called "DRA (distributed Raman amplifier)"). The optical Raman amplifier is an optical amplifier having a wavelength band close to 100 nm, and can amplify an optical signal of a broadband by a low noise. The optical Raman amplifier is disposed on a receiver side of a signal light with respect to an optical transmission line functioning as an amplification medium, and receives a pump light in a direction opposite to a propagation direction of the signal light. A stimulated Raman scattering effect is obtained by incidence of the pump light to amplify the signal light.

FIGS. 1-1A and 1-1B illustrate a configuration of an optical transmission system using an EDFA 102-1 and an EDFA 102-2 as optical amplifiers, and a transition of an optical power to a transmission length, respectively. FIGS. 1-2A and 1-2B illustrate a configuration of an optical transmission system using an EDFA 102-3 and an EDFA 102-4 as optical amplifiers and an optical Raman amplifier module 104, and a transition of an optical power to a transmission length, respectively.

A difference between both systems illustrated in FIGS. 1-1A and 1-2A resides in a power (gain) of the signal light input to repeaters 100-2 and 100-4 which are installed downstream of optical fiber transmission channels 101-1 and 101-2, respectively. In the system illustrated in FIG. 1-2, optical Raman amplification (Raman gain) occurs within the optical fiber transmission channel 101-2 with the aid of the pump light output from a pump light source 103. For that reason, it is found that the power of the signal light rises from the middle of the optical fiber transmission channel 101-2. As a result, the power of the signal light input to the EDFA 102-4 of the repeater 100-4 (FIG. 1-2) becomes larger than the power of the signal light input to the EDFA 102-2 of the repeater 100-2 (FIG. 1-1). Thus, the optical transmission system illustrated in FIG. 1-2A can reduce the deterioration of the OSNR to enable a long-distance optical transmission.

The advantage is obtained as described above. On the other hand, the installation of the optical Raman amplifier into the optical transmission system automatically incurs an increase in the optical power that is input to an optical fiber. For that reason, an optical power of 23 to 25 dBm (200 to 300 mW) at the maximum is input to the optical fiber in the case of a single wavelength pump, and an optical power of an integral multiple of that optical power is simply input to the optical fiber in the case of a wavelength multiplexing pump From the viewpoint of the safety standards of laser, if light is confined in the optical fiber, safety is fundamentally kept. However, once light is leaked from the optical fiber due to attachment/detachment of a connector or disconnection of the optical fiber, energy is consumed, and the environment is adversely affected by the leaked light. For that reason, the optical Raman amplifier suffers from the following four problems.

A first problem resides in a damage of a connector end face. If a foreign matter is attached onto the connector end face, the end face is damaged by a high-output light. In particular, there has been known that phosphor bronze used in a related art FC connector is problematic, and in recent years, an FC connector using no phosphor bronze is mainstream.

A second problem resides in a phenomenon called "fiber fuse". That is, there exists a phenomenon that a core of the optical fiber is partially melted by the light of the high output. There has been known that the melted part is transferred toward a light source while emitting the visual light. For that reason, the optical fiber after the melted part has been transferred is formed with a hollow line in a longitudinal direction of a core area. The transfer phenomenon is continued until the output of the light source is shut down or the optical power is powered down to a threshold value.

A third problem resides in human body safety (provision under JIS C 6802) against laser beam irradiation when the optical transmission line is disconnected or the connector is detached. At present, there is proposed a method in which an output of the light source is automatically stopped by application of a connector having a shutter function or detection of a reflected light.

A fourth problem resides in a damage of a fiber coating. When the optical transmission fiber is put under the high power environments due to the installation of the optical Raman amplifier, if an optical fiber 202 is folded or bent, there is a possibility that the fiber coating may be damaged. For example, as illustrated in FIG. 2, when the optical fiber 202 that connects the devices is deformed with an extremely small radius of curvature within an office building 200, there is a possibility that the above problem occurs. In this case, the light leaked from the optical fiber is absorbed by a coating material, and produces heat. In the worst case, the coating material may take fire.

Accordingly, in order to safely operate an optical communication system, it is very important to solve the above problems. For that reason, a guide line is prepared by, for example, ITU-T (International Telecommunication Union-Telecommunication).

The related art for solving the fourth problem among the above-mentioned problems has proposed a structure corresponding to claim 3 in Japanese Unexamined Patent Application Publication No. 2003-264509. FIG. 3 illustrates a system example corresponding to that structure. Referring to FIG. 3, a transmitter module 301 and a receiver module 302 are connected by an optical fiber transmission line 300.

The transmitter module 301 includes a light source 303 for detection of the fiber bending, an optical fiber 304, and a coupler 305. The coupler 305 is used for multiplexing a detection light output from the light source 303 for detection of fiber bending and an optical main signal of the optical fiber 304.

The receiver module 302 includes a pump laser 306 that outputs a pump light, an optical multiplexer 307 for multiplexing the pump light into an optical fiber transmission line 300, a coupler 308 for demultiplexing the detection light that has propagated in the optical fiber transmission line 300, an optical filter 309, an optical receiver 310 for detection of the fiber bending, and a pump laser controller 311 that controls the pump laser on the basis of measurement results of the optical receiver for detection of the fiber bending. The pump laser controller 311 and the pump laser 306 are connected by a control line 312.

In this example, a wavelength band of 1625 to 1675 nm which is large in bending loss is mainly used for a wavelength of the light source 303 for detection of fiber bending. The optical receiver 310 for detection of the fiber bending within the receiver module 302 receives the optical signal output from the light source 303 for detection of fiber bending, and analyzes data superimposed on the optical signal. When the optical receiver 310 for detection of the fiber bending cannot receive data, or when the optical intensity is lower than a given value, the optical receiver 310 for detection of fiber bending detects the occurrence of the fiber bending. With this detection, the pump laser controller 311 controls the output light intensity of the pump laser 306 to be powered down or shut down.

SUMMARY OF THE INVENTION

However, in the related art system having the light source 303 for detection of fiber bending disposed in the transmitter module 301, a configuration for detecting the fiber bending is separated into the transmitter module 301 and the receiver module 302. For that reason, the related art system cannot detect the fiber bending by a single optical Raman amplifier module (receiver module 302). Also, in the related art system, the pump laser 306 provided in the receiver module 302 is long-distance from the light source 303 for detection of fiber bending. For that reason, the optical intensity of the pump light is attenuated, thereby leading to a possibility that the fiber bending of a portion that is not particularly dangerous or accumulation of bending losses in the overall optical fiber transmission line 300 is detected as the fiber bending. As a result, the related art system controls the light emission of the pump laser 306 to be shut down because of an originally unnecessary cause. In this way, the related art system suffers from such a problem that the precision is low as a method of stopping the pump laser in the optical Raman amplifier module. Further, in the related art system, there is a need to additionally provide a light source dedicated for unnecessary detection in the transmitter module. That is, this provision incurs a problem that the transmitter device is upsized or the costs are increased.

The present invention has been made to address the above-mentioned problems, and aims at realizing a technique by which an abnormal state (for example, fiber bending) of an optical fiber can be detected by a single optical communication module upstream or downstream of an optical fiber transmission line. In particular, an object of the present invention is to provide an optical communication module that can alone detect the abnormal state of the optical fiber within a building where, for example, operation frequency is high, and a heat is liable to be generated due to a pump light power of a high output.

According to one aspect of the present invention, there is provided an optical communication module that outputs a continuous wave light generated by at least one light source to an optical fiber transmission line, including (1) a loss measurement unit that measures a loss of an ASE (amplified spontaneous emission) generated by induction of stimulated Raman scattering while the continuous wave light output from the light source is transmitted through an optical fiber; (2) a fiber abnormality analyzer that detects the abnormal state of the optical fiber transmission line on the basis of loss information on the ASE measured by the loss measurement unit; and (3) a light source controller that controls a supply state of the continuous wave light from the light source on the basis of the detection of the fiber abnormality analyzer.

According to the aspect of the present invention, the abnormal state of the optical fiber transmission line is detected with a high precision, and a supply state of the continuous wave light from the light source can be controlled, by the single optical communication module disposed upstream or downstream of the optical fiber transmission line. The other problems, configurations, and advantages will become apparent from the description of the following embodiments.

BRIEF DESCRIPTION OF THE DRAWINGS

FIGS. 1-1A and 1-1B are diagrams illustrating optical amplification in an optical transmission system, in which FIG. 1-1A is a diagram illustrating a system configuration when only an EDFA is used for optical amplification, and FIG. 1-1B is a diagram illustrating a change in an optical power to a transmission length;

FIGS. 1-2A and 1-2B are diagrams illustrating optical amplification in an optical transmission system, in which FIG. 1-2A is a diagram illustrating a system configuration when the EDFA and an optical Raman amplifier are used for optical amplification, and FIG. 1-2B is a diagram illustrating a change in the optical power to the transmission length;

FIG. 2 is a diagram illustrating bending occurrence of an optical fiber in a station building;

FIGS. 5A, 5B, and 5C are diagrams illustrating a wavelength dependence of loss caused by fiber bending, in which FIG. 5A is a diagram illustrating a wavelength dependence of an optical loss when an optical fiber having the same radius of curvature is bent, FIG. 5B is a diagram illustrating a relationship between an optical main signal and an optical noise of the optical Raman amplifier when the optical fiber is not bent, and FIG. 5C is a diagram illustrating a relationship between the optical main signal and the optical noise of the optical Raman amplifier when the optical fiber is bent, FIG. 6 is a configuration diagram of an optical Raman module according to a second embodiment;

DETAILED DESCRIPTION OF THE PREFERRED EMBODIMENTS

Hereinafter, embodiments of the present invention will be described with reference to the accompanying drawings. The embodiments of the present invention are not limited to embodiments described later, but can be variously modified without departing from a technical concept of the present invention.

1. First Embodiment

Figures 1, 1A:
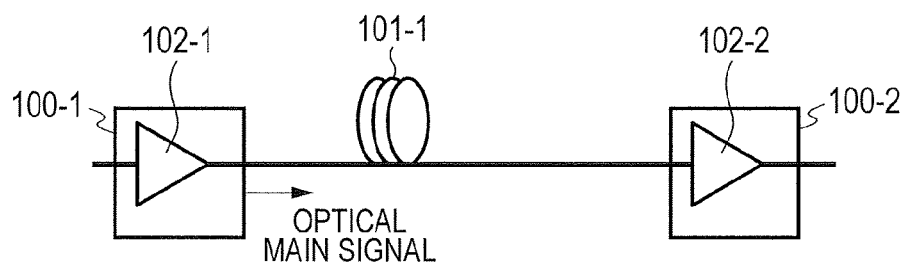
Figures 1, 1B:
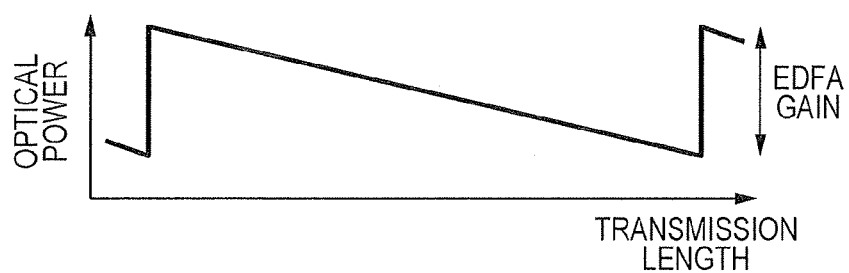
Figures 1, 2, 2A:
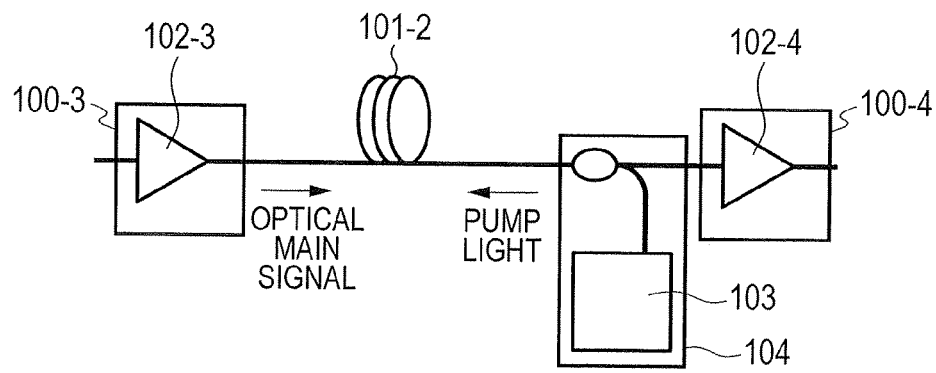
Figures 1, 2, 2B:
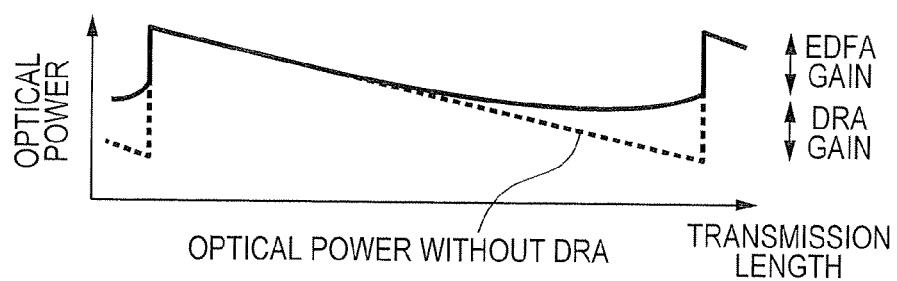
Figure 2:
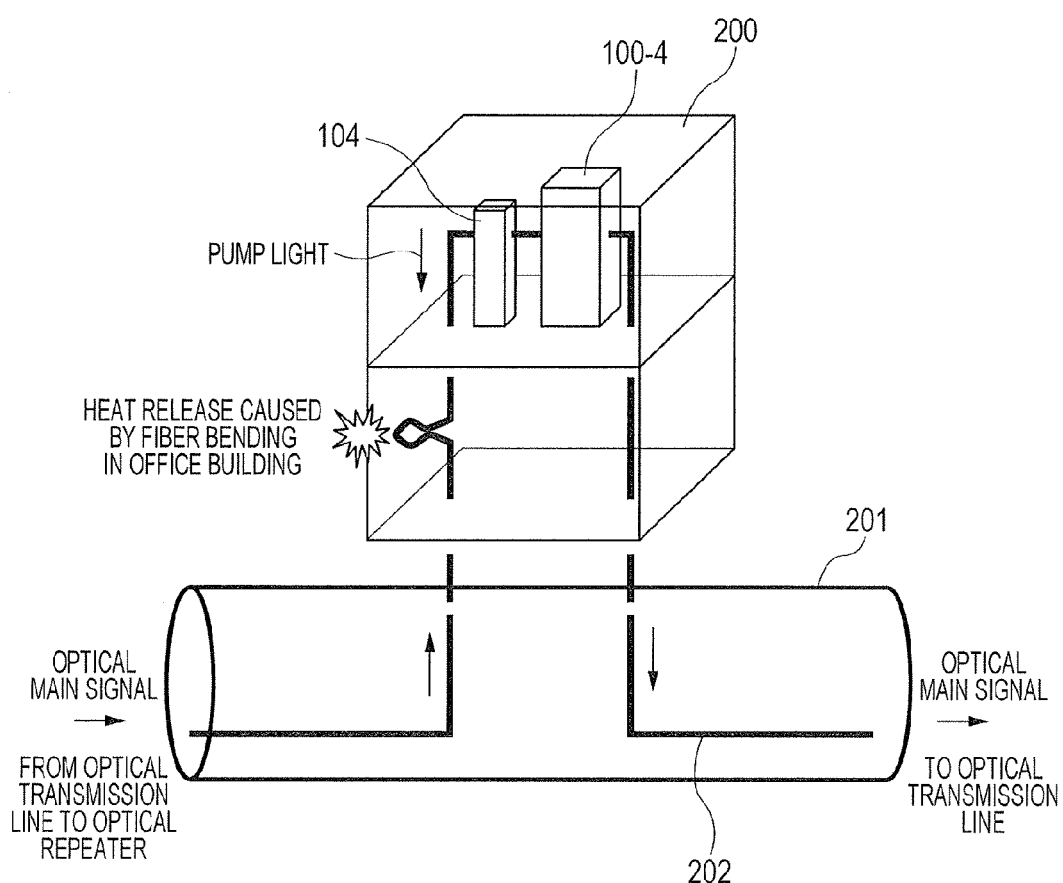
Figure 3:
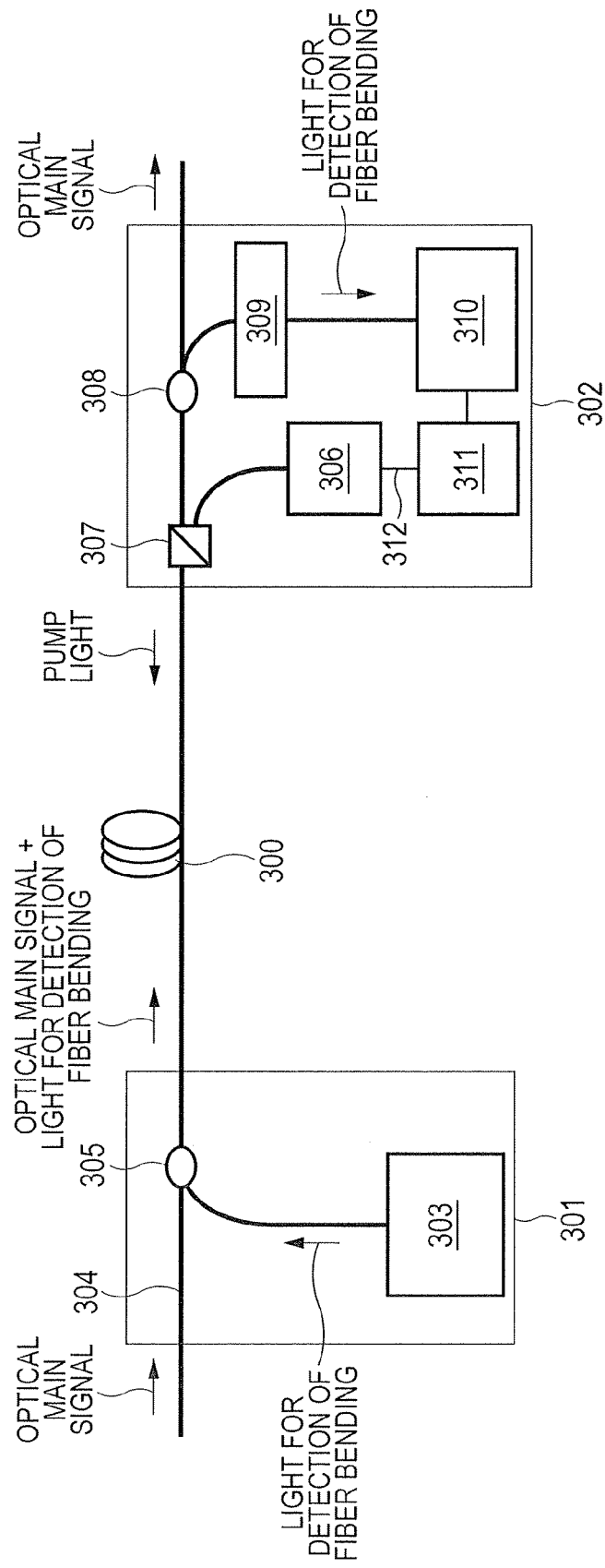
FIG. 3 is a diagram illustrating a related art system.
Figure 4:
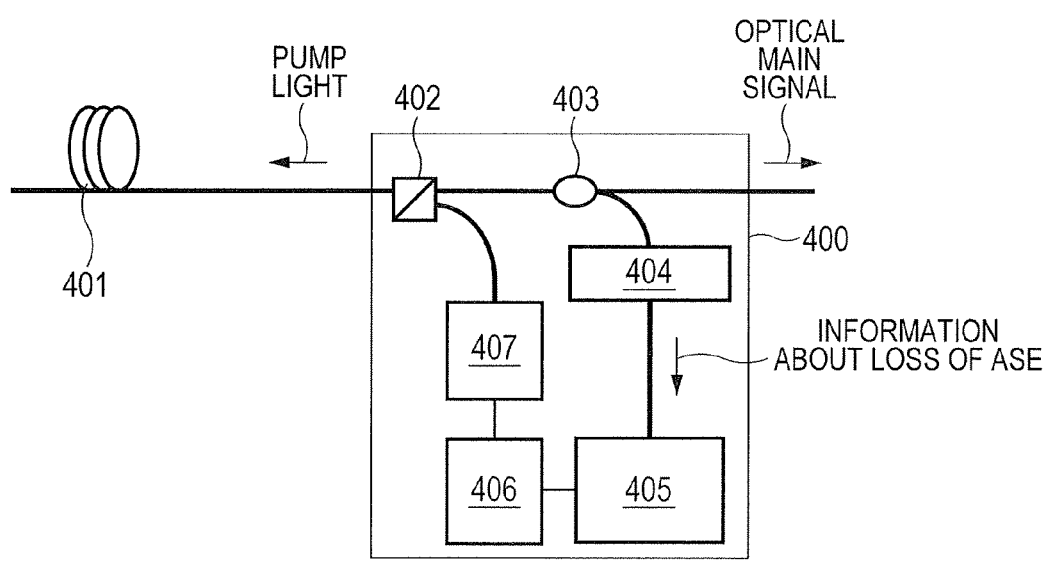
FIG. 4 is a configuration diagram of an optical Raman module according to a first embodiment.

FIG. 4 illustrates an outline configuration of an optical communication module 400 according to a first embodiment. The optical communication module 400 includes an optical multiplexer 402, a coupler 403, a loss measurement unit 404, an optical fiber abnormality analyzer 405, a pump laser controller 406, and a pump laser 407.

Among those components, the loss measurement unit 404 monitors a loss of an ASE (Amplified Spontaneous Emission) that is generated in an optical fiber transmission line 401 by the pump light output from the pump laser 407, and propagated in a direction opposite to a traveling direction of the pump light. The loss measurement unit 404 monitors, for example, the attenuation of an optical intensity generated by bending of the optical fiber.

The optical fiber abnormality analyzer 405 detects whether there is an abnormal state of the optical fiber transmission line 401, on the basis of loss information of the ASE measured in the loss measurement unit 404.

The pump laser controller 406 controls a supply state of the continuous wave light from the pump laser 407 on the basis of a detection result of the optical fiber abnormality analyzer 405. For example, when abnormality of the optical fiber transmission line 401 is detected, the pump laser controller 406 controls the supply state of the pump light from the pump laser 407 to be shut down or powered down.

Figure 5A:
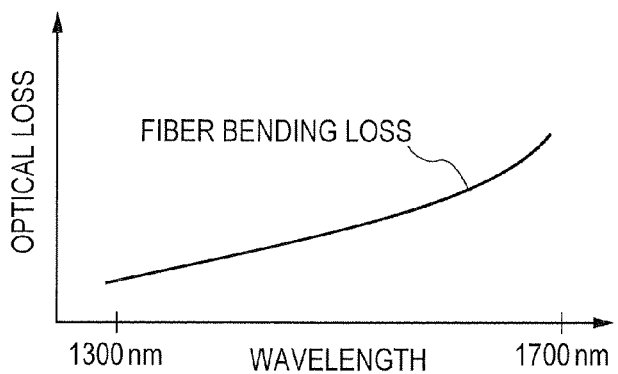
Figure 5B:
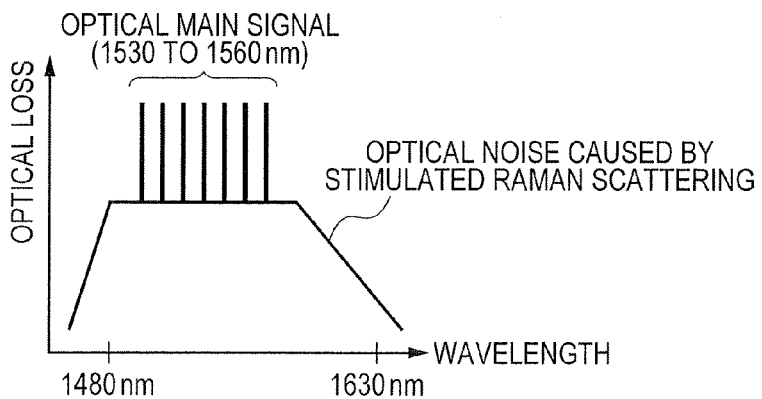
Figure 5C:
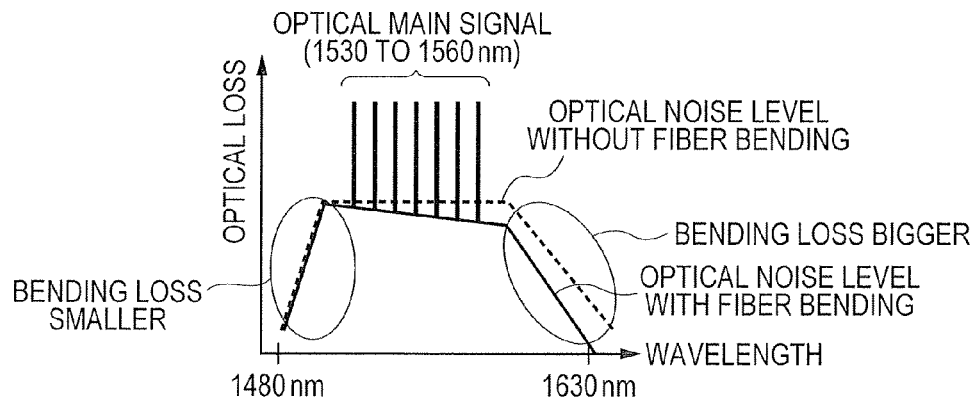

Hereinafter, a description will be given of a configuration in which the bending of the optical fiber can be monitored by monitoring the loss information on the ASE. Principle diagrams are illustrated in FIGS. 5A, 5B, and 5C. As illustrated in FIG. 5A, it is found that a loss of the light in a long wavelength side is generally larger than a loss of the light in a short wavelength side with respect to the fiber bending having the same radius of curvature. That is, when a C-band (1530 to 1565 nm) is used as an optical main signal for long-length optical transmission, as illustrated in FIGS. 5B and 5C, it is found that the loss caused by the fiber bending in the long wavelength side of the ASE (about 1560 to 1640 nm) is larger than the loss caused by the fiber bending in the short wavelength side (1480 to 1530 nm) of the ASE of the optical Raman amplifier.

In this embodiment, attention is paid to the above phenomenon, and the abnormality (for example, fiber bending) of the optical fiber transmission line 401 is detected. For example, when the fiber is bent, the loss of the pump light (1420-1460 nm) short in the wavelength is smaller. That is, a change of the gain in the short wavelength side is small. On the other hand, a loss of the ASE in the long wavelength side (for example, 1625 nm) is large. That is, a change of the gain in the long wavelength side is larger than a change of the gain in the short wavelength side. The optical fiber abnormality analyzer 405 pays attention to a difference in the change of the loss or gain, and detects the abnormality occurring in the optical fiber transmission line 401.

A wavelength of the ASE monitored by the loss measurement unit 404 may not be 1625 nm. However, it is preferable that the wavelength of the ASE is longer than the wavelength band (1530 to 1560 nm) of the optical main signal. Also, it is preferable that the ASE monitored by the loss measurement unit 404 is longer in the wavelength than the optical main signal even when the wavelength band of the optical main signal is L-band (1565 to 1625 nm).

When the optical intensity of the pump light is lowered due to a factor other than the fiber bending (for example, deterioration of the pump laser 407 with time), the reduction in the gain in the short wavelength side and the loss of the ASE in the long wavelength side occur at substantially the same rate. Accordingly, if a gain measurement unit (not shown) that acquires Raman gain information of the pump laser 407 is mounted in the optical communication module 400 in addition to the loss measurement unit 404, it can be discriminated whether the attenuation of the optical intensity is caused by the fiber bending or another factor.

The change in the Raman gain may be detected according to a relationship between the change in the optical intensity of the ASE (stimulated Raman scattering light) or the change in the loss, and the change in the gain in the short wavelength side (for example, 1490 nm) small in the loss caused by the fiber bending. Alternatively, the change in the Raman gain may be acquired through an on/off gain acquired by measuring the optical loss of the wavelength band of the optical main signal for optical communication.

Also, when the pump laser employing an auto gain control system or an auto level control system is used, a driving current for driving the pump laser may be measured to detect a change in the Raman gain according to a relationship between a change in the driving current and a change in the gain.

Also, an output optical intensity of the pump light may be measured to detect a change in the Raman gain according to the relationship between the change in the intensity and the change in the gain. Also, the optical intensity of a backscattering light occurring in the optical fiber may be measured to detect the change in the Raman gain according to a relationship between the change in the optical intensity and the change in the gain. Also, the change in the gain may be detected through other methods.

It is desirable to remove a failure factor such as the fiber bending or the connector breakage caused by an OTDR (optical time-domain reflectometer) immediately before service-in where the operation of the optical communication starts. When the above-mentioned loss measurement unit 404 and gain measurement unit detects that the fiber is bent at a given radius of curvature or lower, the pump laser controller 406 shuts down or powers down the supply state of the pump light from the pump laser 407. Then, after a fiber bent portion is specified, and the fiber bending is eliminated, the optical communication is restarted.

An amplification principle of the optical Raman amplifier according to the present invention uses the stimulated Raman scattering which is a nonlinearity optical effect of the optical fiber. That is, when a total power of the optical signal that passes through the optical fiber exceeds a specific threshold value, a phenomenon that the stimulated Raman scattering light (ASE) occurs in the long wavelength side from the optical signal by about 100 nm is used.

When the optical signal is demultiplexed into several to several hundred optical fiber paths by an optical coupler, for example, as in a PON (passive optical network) system that is a high-speed optical access system, the optical signal is output from an OLT (optical line terminal) within an in-office device to an ONU (optical network unit) within the in-office device with a high optical intensity, taking the loss caused by demultiplexing into account.

For that reason, there is a possibility that the stimulated Raman scattering is generated in the vicinity of the OLT. Accordingly, the detection function of the optical fiber bending and the control function of the pump laser as described above may be provided within the OLT of the PON system. Hereinafter, specific examples of those embodiments will be described in detail.

2. Second Embodiment

In a second embodiment, a description will be given of a system in which the occurrence of the fiber bending is detected on the basis of a loss difference between the optical noise in the long-wavelength side and the optical noise in the short-wavelength side which appear in the optical fiber which is a transmission line of the optical main signal.

FIG. 6 illustrates a block configuration of an optical Raman amplifier module 500 according to the second embodiment. In FIG. 6, the optical Raman amplifier module 500 is disposed downstream of an optical fiber transmission line 501 configuring the optical fiber communication system (backward pumping scheme). However, the optical Raman amplifier module 500 may be disposed at the upstream side with respect to the optical fiber transmission line 501, and may input the pump light toward the downstream side (forward pumping scheme). Also, the optical Raman amplifier module 500 may be disposed at both of the upstream and downstream sides with respect to the optical fiber transmission line 501 (bi-directional pumping scheme). Also, the optical Raman amplifier module 500 and the optical fiber transmission line 501 may be included within the optical transmission system.

The optical Raman amplifier module 500 includes a pump laser 502, an optical multiplexer 503, an optical fiber 504, couplers 505 and 506, optical filters 507 and 508, optical receivers 509 and 510, a loss difference calculator 511, a lookup table 512, an optical fiber bending analyzer 513, a pump laser controller 514, and a control line 515 therein.

In this example, the pump laser 502 generates the pump light for amplifying the main signal light that propagates in the optical fiber transmission line 501, and outputs the pump light toward the upstream side of the optical fiber transmission line 501. The optical multiplexer 503 is an optical element that multiplexes the pump light output from the pump laser 502 into the optical fiber transmission line 501 through which the optical main signal for information communication is propagated. The optical fiber 504 is connected to the optical fiber transmission line 501, through which the optical main signal and the ASE are propagated. The coupler 505 is an optical element that demultiplexes apart of the ASE to be measured from the optical fiber 504. The coupler 506 is an optical element that demultiplexes the ASE demultiplexed from the optical fiber 504 into two routes.

The optical filter 507 is an optical element for transmitting the optical noise in only the long wavelength side in order to detect the loss of the ASE in the long wavelength side. The optical filter 508 is an optical element for transmitting the optical noise in only the short wavelength side in order to detect the loss of the ASE of the short wavelength side. The optical receiver 509 is an optical/electrical converter for measuring the loss of the optical noise in the long wavelength side. The optical receiver 510 is an optical/electrical converter for measuring the loss of the short wavelength side noise light.

The loss difference calculator 511 is a functional unit or a circuit for calculating the loss difference between the long wavelength side noise light and the short wavelength side noise light. The lookup table 512 is a storage area for storing a relationship between a magnitude of the loss difference of the long wavelength side noise light and the short wavelength side noise light, and the degree of the fiber bending (radius of curvature of the fiber). The optical fiber bending analyzer 513 is a functional unit or circuit for analyzing the degree of the fiber bending corresponding to the magnitude of the measured loss difference with reference to the lookup table 512. The optical fiber bending analyzer 513 knows information on the kind of optical fiber used for connection to the optical Raman amplifier module 500 through a management communication in advance.

The pump laser controller 514 a controller or circuit for controlling an output optical intensity of the pump light generated by the pump laser 502 according to the degree of the fiber bending which is analyzed by a fiber bending analyzer 113. Incidentally, a control signal of the output optical intensity is output to the pump laser 502 from the pump laser controller 514 through the control line 515.

Figure 7:
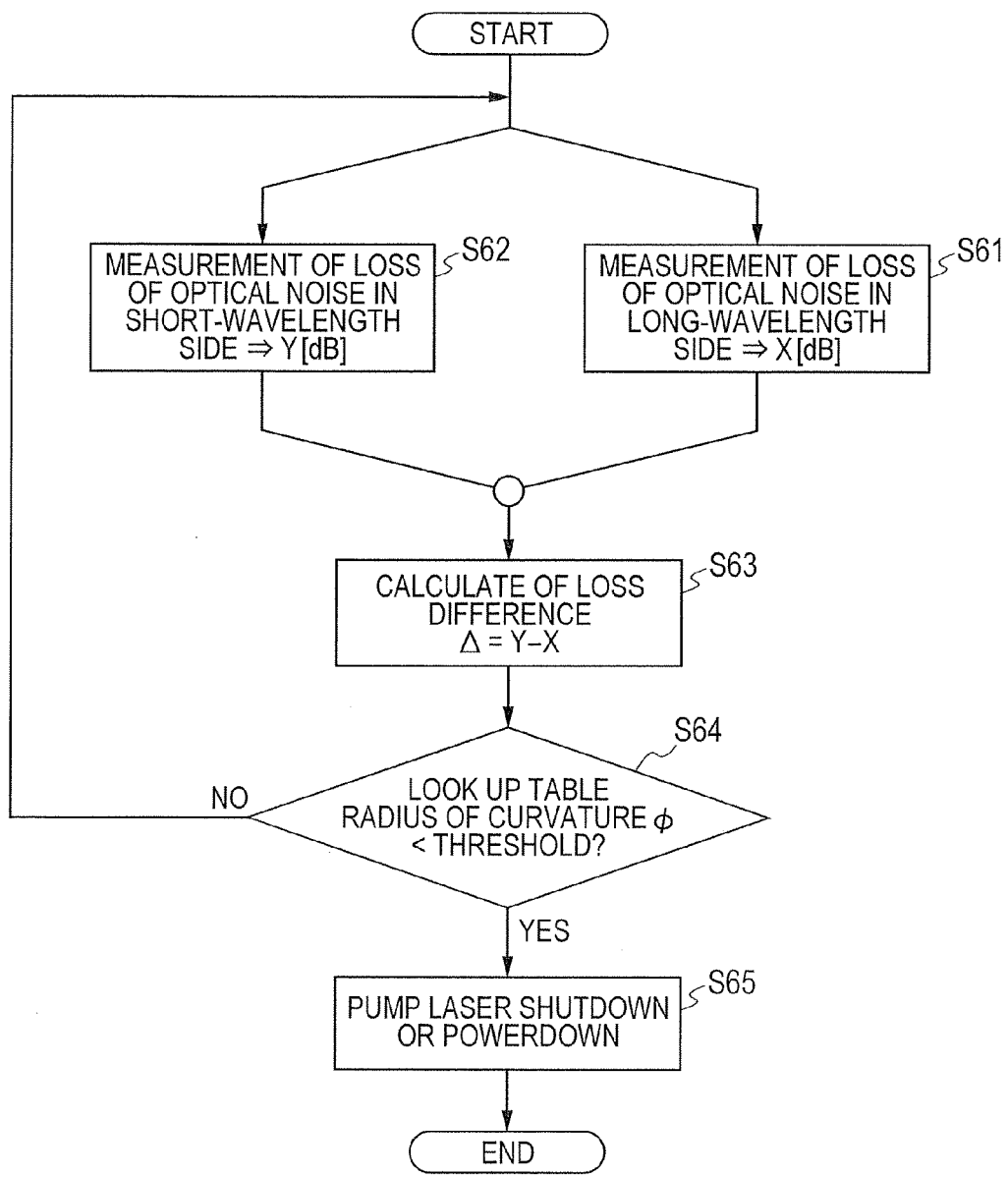
FIG. 7 is a diagram illustrating a flowchart used in the second embodiment and sixth and seventh embodiments.

Hereinafter, a description will be given of the detection of the fiber bending and the shutdown or powerdown control of the pump laser by the optical Raman amplifier module 500 (FIG. 6) with reference to a flowchart of FIG. 7. The operation of the flowchart is conducted by the optical Raman amplifier module 500. The optical Raman amplifier module 500 always executes the processing of FIG. 7.

In this example, it is assumed that the optical fiber is bent, and a light of the long wavelength band is lost. In this case, in Step S61, the optical Raman amplifier module 500 measures the loss of the optical noise in the long wavelength side. At the same time, in Step S62, the optical Raman amplifier module 500 measures the loss of the short wavelength side noise light.

In Step S63, the optical Raman amplifier module 500 (loss difference calculator 511) calculates a difference between the losses measured in Steps S61 and S62. In Step S63, information on the calculated loss difference is transmitted to the optical fiber bending analyzer 513.

In Step S64, the optical fiber bending analyzer 513 determines the radius of curvature of the optical fiber corresponding to the loss difference with reference to the lookup table 512. If the radius of curvature of the fiber bending exceeds a predetermined threshold value, the optical Raman amplifier module 500 (optical fiber bending analyzer 513) advances to Step S65. If the radius of curvature of the fiber bending does not exceed the predetermined threshold value, the optical Raman amplifier module 500 (optical fiber bending analyzer 513) returns to a start of the flowchart, and repeats Steps S61 to S64.

In Step S65, the optical Raman amplifier module 500 (pump laser controller 514) controls the output optical intensity of the pump light from the pump laser 502 through the control line 515 to shut down or power down the pump light.

Thereafter, an operator specifies the bent portion of the fiber, and restarts the operation of optical communication after the bending has been eliminated.

Figure 15:
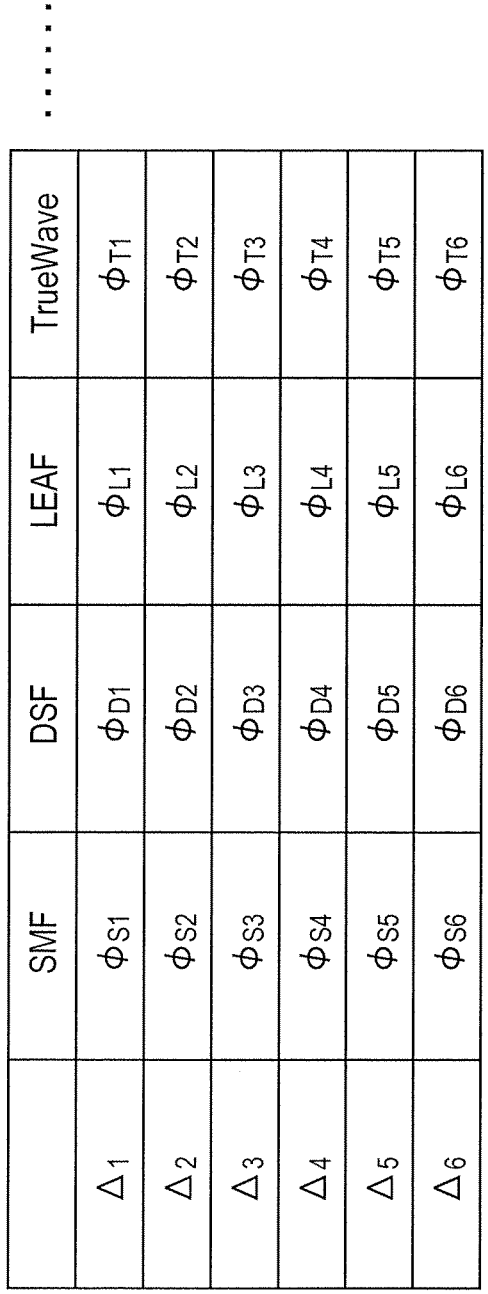
FIG. 15 is a diagram illustrating an example of a lookup table used in the second, sixth and seventh embodiments.

FIG. 15 illustrates an example of the lookup table 512. In FIG. 15, rows represent loss differences Δ, and columns represent the kinds of optical fibers. The optical fiber bending analyzer 513 determines an appropriate radius of curvature φ with reference to the rows and the columns of the lookup table 512. Thereafter, the optical fiber bending analyzer 513 determines whether there is the fiber bending required to be controlled, or not, on the basis of the determined radius of curvature φ.

If the fiber bending is detected, the optical fiber bending analyzer 513, for example, (1) displays a warning on a screen of a personal computer for control, (2) turns on an LED for warning display which is arranged on a front panel of the optical Raman amplifier module 500, and (3) notifies an NMS (network management system) of the fiber bending, thereby notifying a network device or a network manager of an entire optical transmission system that the optical fiber is abnormal. In this example, the NMS always monitors a network, and manages an alive monitoring of a server and various devices which are connected to the network, and a traffic trouble.

The lookup table 512 is not limited to the lookup table illustrated in FIG. 15, but may be configured by various lookup tables without departing from functions as the lookup table.

The loss difference calculator 511 may calculate a difference of the optical intensity instead of the loss difference (loss difference between the long wavelength side noise light and the short wavelength side noise light). Also, in this embodiment, it is assumed that the abnormal state of the optical fiber is fiber bending. However, the abnormal state of the optical fiber may be an optical connector disconnection of the optical Raman amplifier module 500, or the fiber breakage of the optical fiber transmission line 501. For example, both of the optical intensities of the long wavelength side noise light and the short wavelength side noise light, which are input to the optical receivers 509 and 510, respectively, disappear (optical intensity is zero). In this case, the optical fiber bending analyzer 513 determines that the fiber breakage occurs due to the optical connector disconnection or the fiber breakage caused by a fiber fuse, and stops the output of the pump light. When the optical fiber bending analyzer 513 stops the output of the pump light, a scattering light having a high optical intensity is irradiated into air, and can prevent an influence of the scattering light on a human body in advance.

Also, when the optical fiber bending is instantly eliminated even if the optical fiber bending occurs, the optical fiber bending analyzer 513 may be provided with a function for not allowing the shutdown or powerdown of the pump light output from the pump laser 502 to be implemented. For example, the optical fiber bending analyzer 513 may average the radius of curvature of the fiber bending for several seconds, and not detect the optical fiber bending that is restored instantly or in a short time.

According to this embodiment, the fiber bending can be detected by the single receiver module (that is, single optical Raman amplifier module) to control the pump laser to be shut down and the amount of light to be powered down. As a result, the pump laser for detection of the fiber bending can be eliminated from the transmitter module. For that reason, the transmitter module can be downsized and reduced in costs.

Also, because the fiber bending can be detected by the single receiver module (that is, the single optical Raman amplifier module), the contents of control or the contents of adjustment as required can be facilitated as compared with the related art system.

When the optical Raman amplifier module 500 is applied to the forward pumping scheme or the bi-directional pumping scheme, the optical communication module disposed at the upstream side with respect to the optical fiber transmission line measures the loss of the ASE that is propagated in the same direction (forward direction) as that of the optical main signal. The same is applied to other embodiments which will be described later.

3. Third Embodiment

In a third embodiment, a description will be given of a system of detecting the occurrence of the fiber bending on the basis of the loss information of the long wavelength side noise light appearing in the optical fiber that is a transmission line of the optical main signal, and control information on the pump laser.

Figure 8:
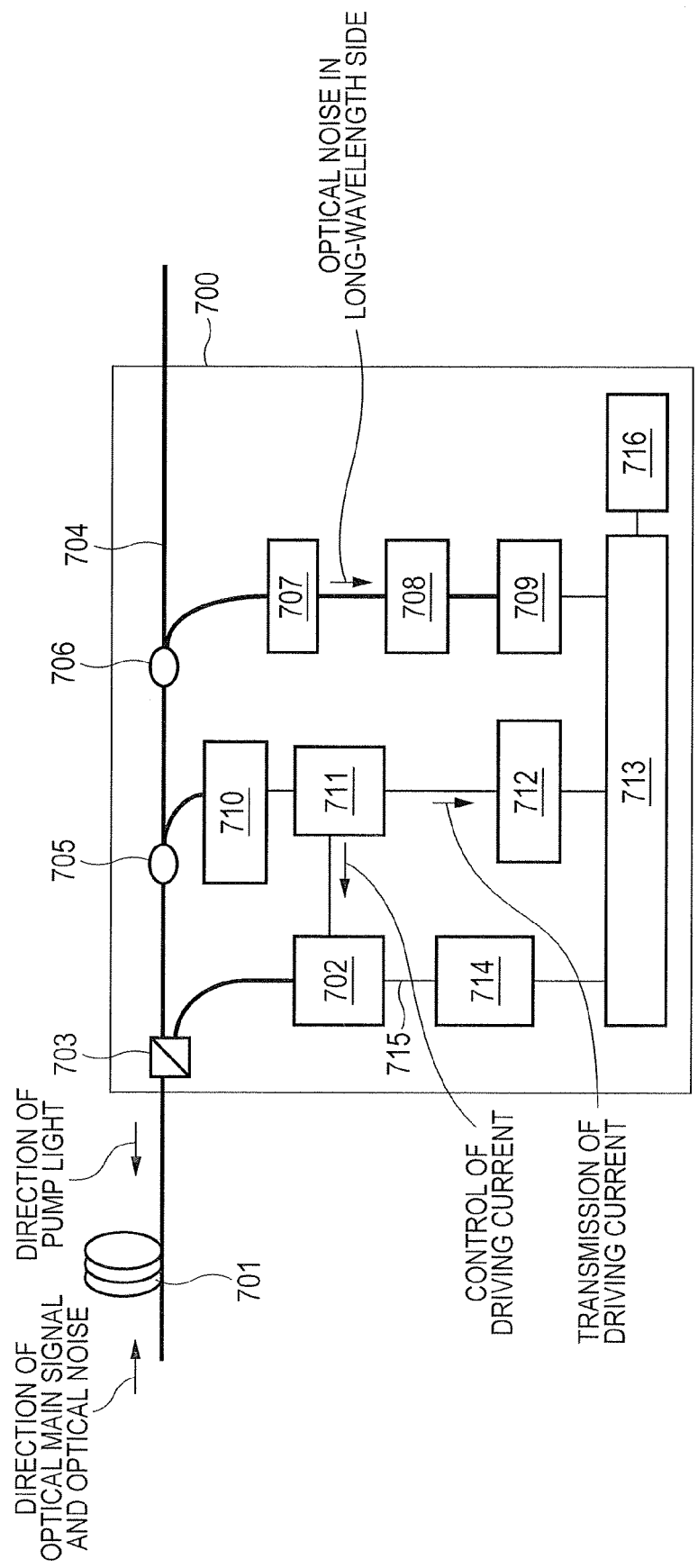
FIG. 8 is a configuration diagram of an optical transmission system according to a third embodiment.

FIG. 8 is a block diagram illustrating a configuration of an optical Raman amplifier module 700 according to the third embodiment. In FIG. 8, the optical Raman amplifier module 700 is disposed downstream of an optical fiber transmission line 701 in the optical fiber communication system (forward pumping scheme). However, the optical Raman amplifier module 700 may be disposed at the upstream side with respect to the optical fiber transmission line 701, and may input the pump light toward the downstream side (forward pumping scheme). Also, the optical Raman amplifier module 700 may be disposed at both of the upstream and downstream sides with respect to the optical fiber transmission line 701 (bi-directional pumping scheme). Also, the optical Raman amplifier module 700 and the optical fiber transmission line 701 may be included in the optical transmission system.

The optical Raman amplifier module 700 includes a pump laser 702, an optical multiplexer 703, an optical fiber 704, couplers 705 and 706, an optical filter 707, an optical receiver 708, a loss calculator 709, an optical detector 710, a driving current controller 711, a current change calculator 712, an optical fiber bending analyzer 713, a pump laser controller 714, a control line 715, and a lookup table 716 therein.

In this example, the pump laser 702 generates the pump light for amplifying the main signal light that propagates in the optical fiber transmission line 701, and outputs the pump light toward the upstream side of the optical fiber transmission line 701. The optical multiplexer 703 is an optical element that multiplexes the pump light output from the pump laser 702 into the optical fiber transmission line 701 through which the optical main signal for information communication is propagated.

The optical fiber 704 is connected to the optical fiber transmission line 701, through which the optical main signal and the ASE are propagated. The coupler 705 is an optical element that demultiplexes a partial light from the optical fiber 704. The coupler 706 is an optical element that demultiplexes the ASE. The optical filter 707 is an optical element that transmits only the long wavelength side noise light in order to detect the loss of the ASE in the long wavelength side. The optical receiver 708 is an optical/electrical converter for measuring the loss of the optical noise in the long wavelength side.

The loss calculator 709 is a functional unit or circuit for calculating the loss of the optical noise in the long wavelength side. The optical detector 710 is an optical/electrical converter that converts the light demultiplexed from the optical fiber 704 by the coupler 705 into an electric signal in order to drive the pump laser 702 according to a given control scheme.

The driving current controller 711 is a controller or circuit for controlling a driving current of the pump laser 702 on the basis of an electric signal (light amount information). The current change calculator 712 is a functional unit or circuit for monitoring a current value set in the driving current controller 711, and calculating a change in the current value.

The optical fiber bending analyzer 713 is a functional unit or circuit for analyzing the degree of the fiber bending corresponding to information acquired by the loss calculator 709 and the current change calculator 712 with reference to the lookup table 716.

The pump laser controller 714 is a controller or circuit for controlling the output optical intensity of the pump light from the pump laser according to the degree of the fiber bending analyzed by the optical fiber bending analyzer 713. Incidentally, a control signal of the output optical intensity is output to the pump laser 702 from the optical fiber bending analyzer 713 through the control line 715. The lookup table 716 is configured by a table having a data structure illustrated in FIG. 16.

In this example, an auto gain control (AGC) system or an auto level control (ALC) system is preferably used as a system for controlling the driving current of the pump laser 702. In the simplest control mode of the auto gain control, when the optical detector 710 monitors the Raman gain and detects a decrease or increase of the Raman gain, the driving current controller 711 changes a value of the driving current so that the Raman gain becomes a predetermined value.

On the other hand, in the simplest control mode of the auto level control, when the optical detector 710 monitors, for example, the optical intensity of the optical main signal, and the driving current controller 711 changes a value of the driving current to become a predetermined optical intensity.

In the third embodiment, the change in the driving current of the pump laser 702 is monitored to acquire information on the Raman gain. This control utilizes that the driving current value is increased in order to eliminate the optical loss caused by the fiber bending according to the above-mentioned control system (AGC, ALC) when the optical loss occurs due to the fiber bending. Together with the detection of the optical loss, it is detected that the optical fiber is bent when the optical loss of the optical noise in the long wavelength side is a given threshold value (threshold value I) or more. When the optical loss is the threshold value I or lower, it is determined that the Raman gain is reduced by another factor such as deterioration of the pump laser 702 with time.

Figure 9:
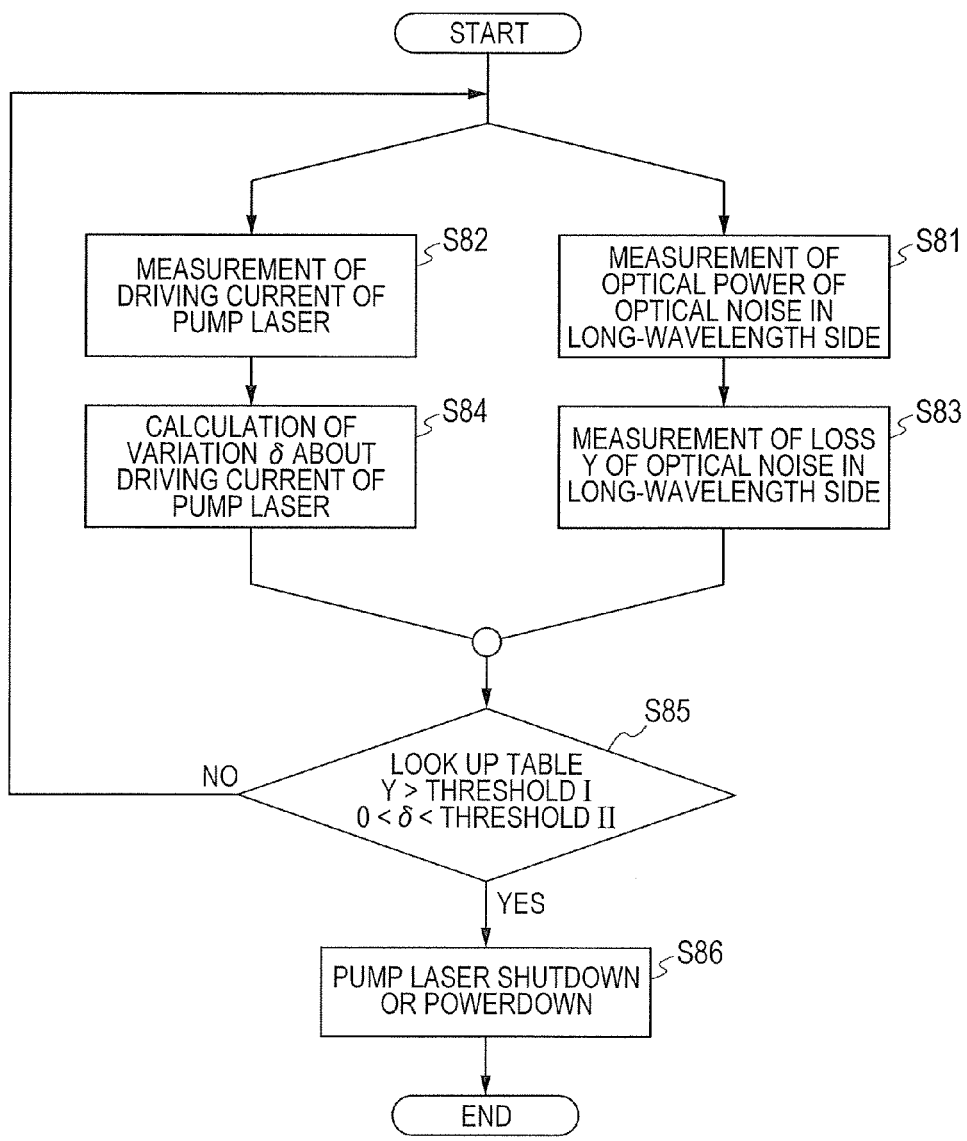
FIG. 9 is a diagram illustrating a flowchart used in the third embodiment.

Hereinafter, a description will be given of the detection of the fiber bending and the shutdown or powerdown control of the pump laser by the optical Raman amplifier module 700 (FIG. 8) with reference to a flowchart of FIG. 9. The operation of the flowchart is conducted by the optical Raman amplifier module 700. The optical Raman amplifier module 700 always executes the processing of FIG. 9.

When the optical fiber is bent, and a light of the long wavelength band is lost, the optical Raman amplifier module 700 measures the loss of the optical noise in the long wavelength side in Step S81. At the same time, in Step S82, the driving current controller 711 monitors a driving current value of the pump laser. Subsequently, in Step S83, the optical Raman amplifier module 700 (loss calculator 709) calculates the loss of the optical noise of the long wavelength side. At the same time, in Step S84, the optical Raman amplifier module 700 (current change calculator 712) calculates a change in the driving current value monitored in Step S82.

Figure 16:
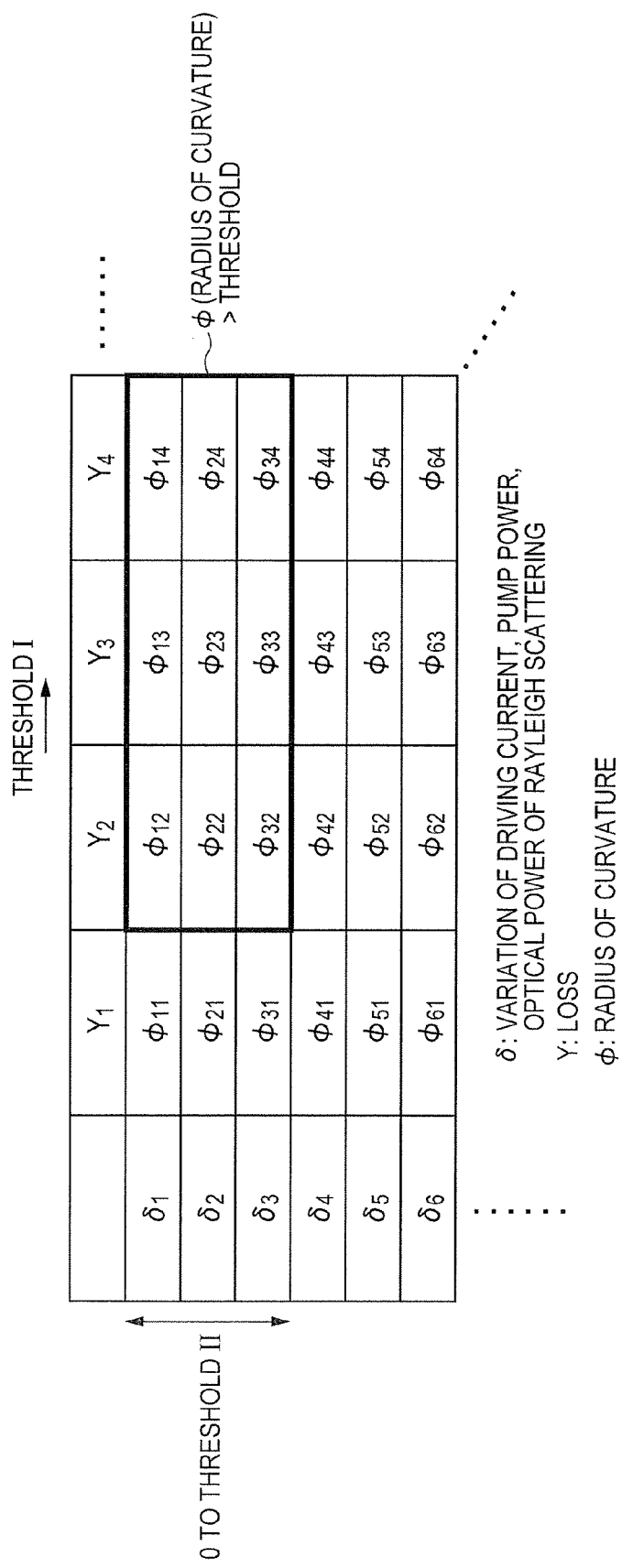
FIG. 16 is a diagram illustrating an example of a lookup table used in the third, fourth, and fifth embodiments.

Thereafter, information on the loss (S83) and a variation of the driving current (S84) are transmitted to the optical fiber bending analyzer 713. In Step S85, the optical Raman amplifier module 700 (optical fiber bending analyzer 713) determines the radius of curvature corresponding to the information on the loss and the variation of the driving current with reference to the lookup table 716 (FIG. 16). In FIG. 16, rows represent variations δ of the driving current, and columns represent the losses Y.

In this example, the optical fiber bending analyzer 713 determines that the radius of curvature of the optical fiber bending exceeds a predetermined threshold value, for example, if the loss exceeds a predetermined threshold value I, and the variation of the driving current is a value between 0 and a threshold value II (range surrounded by a bold line in FIG. 16). In this case, the optical fiber bending analyzer 713 is advanced to Step S86. On the contrary, the optical fiber bending analyzer 713 returns to a start of the flowchart, for example, if the loss does not exceed the predetermined threshold value I, and repeats Steps S81 to S85.

If the variation of the driving current exceeds the threshold value II, it is conceivable that the loss of the light of the long wavelength band is generated by a factor other than the loss caused by the fiber bending. The reason that the threshold value II is provided is because the optical loss in the short wavelength side band or the optical main signal band is not larger than the optical loss in the long wavelength side caused by the bending of the optical fiber. If the variation of the driving current exceeds the threshold value II, it is conceivable that the loss of the light of the long wavelength band is generated by another factor different from the fiber bending, for example, the connector disconnection or the optical fiber breakage, and treatments corresponding to those factors are required.

In Step S86, the pump laser controller 714 controls the output optical intensity of the pump light from the pump laser 702 through the control line 715, and shuts down or powers down the output of the pump light. In this embodiment, a relationship of the loss information in the long wavelength side, the variation of the driving current from the pump laser, and the radius of curvature of the optical fiber is detected on the basis of the lookup table of FIG. 16. However, another lookup table may be used.

As described above, even in this embodiment, the same advantages as those in the first embodiment can be realized.

4. Fourth Embodiment

In a fourth embodiment, a description will be given of a system in which the occurrence of the fiber bending is detected on the basis of the loss information on the optical noise in the long wavelength side appearing in the optical fiber which is a transmission line of the optical main signal, and the optical intensity information on the pump light supplied to the optical fiber.

Figure 10:
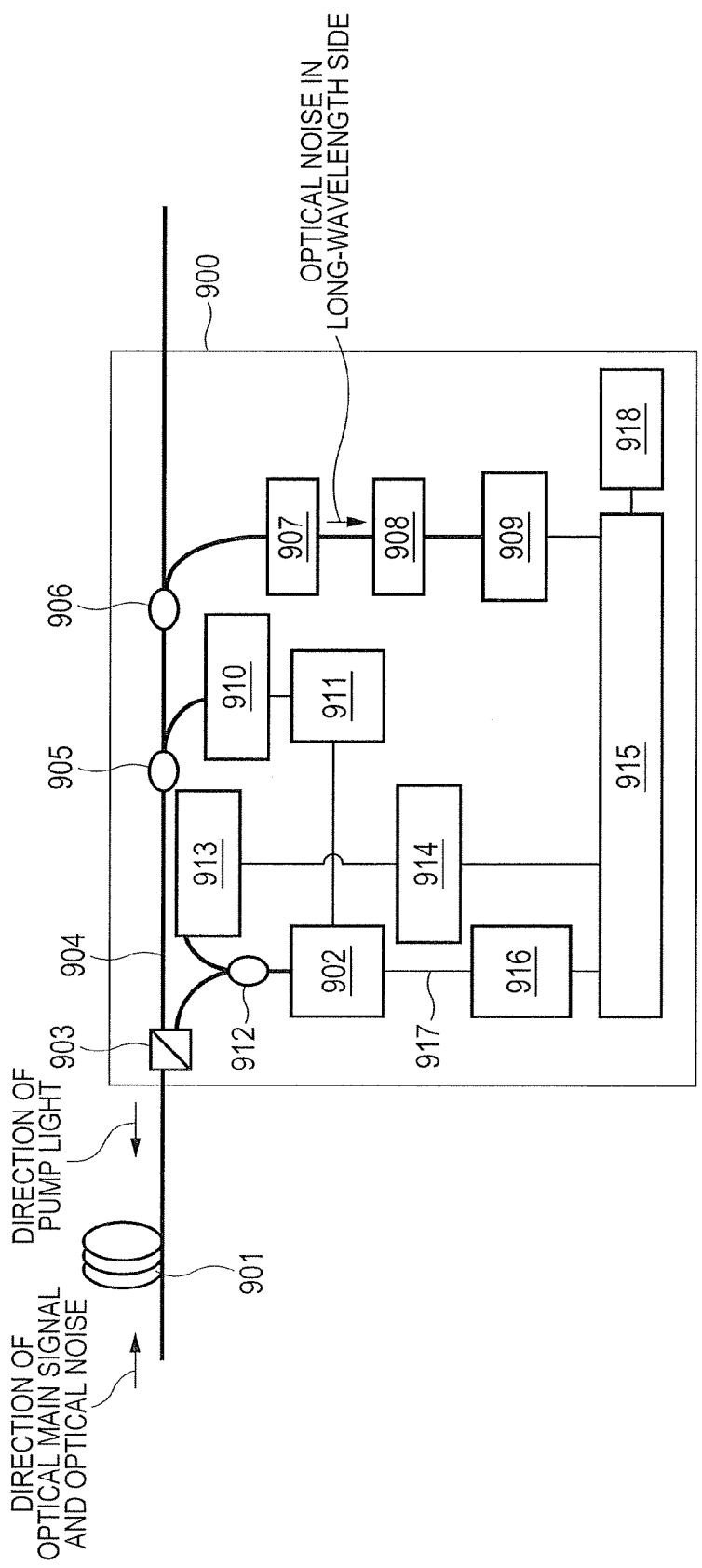
FIG. 10 is a configuration diagram of an optical transmission system according to a fourth embodiment.

FIG. 10 illustrates a block configuration of an optical Raman amplifier module 900 according to a fourth embodiment. In FIG. 10, the optical Raman amplifier module 900 is disposed downstream of an optical fiber transmission line 901 in an optical fiber communication system (backward pumping scheme) However, the optical Raman amplifier module 900 may be arranged at the upstream side with respect to the optical fiber transmission line 901, and input the pump light toward the downstream side (forward pumping scheme). Also, the optical Raman amplifier module 900 may be disposed at both of the upstream and downstream sides with respect to the optical fiber transmission line 901 (bi-directional pumping scheme). Also, the optical Raman amplifier module 900 and the optical fiber transmission line 901 may be included in the optical transmission system.

The optical Raman amplifier module 900 includes a pump laser 902, an optical multiplexer 903, an optical fiber 904, couplers 905 and 906, an optical filter 907, an optical receiver

908, a loss calculator 909, an optical detector 910, a driving current controller 911, a coupler 912, an optical detector 913, a pump power change calculator 914, an optical fiber bending analyzer 915, a pump laser controller 916, a control line 917, and a lookup table 918 therein.

In this example, the pump laser 902 generates the pump light for amplifying the main signal light that propagates in the optical fiber transmission line 901, and outputs the pump light toward the upstream side of the optical fiber transmission line 901. The optical multiplexer 903 is an optical element that multiplexes the pump light output from the pump laser 902 into the optical fiber transmission line 901 through which the optical main signal for information communication is propagated.

The optical fiber 904 is connected to the optical fiber transmission line 901, through which the optical main signal and the ASE are propagated. The coupler 905 is an optical element that demultiplexes a partial light from the optical fiber 904. The coupler 906 is an optical element for demultiplexing the ASE. The optical filter 907 is an optical element that transmits the optical noise of only the long wavelength side in order to detect the loss of the ASE in the long wavelength side. The optical receiver 908 is an optical/electrical converter used for measuring the optical intensity of the optical noise in the long wavelength side.

The loss calculator 909 is a functional unit or circuit for calculating the loss of the optical noise in the long wavelength side. The optical detector 910 is an optical/electrical converter that converts the light propagated in the optical fiber 904 into an electric signal, for feedback control of the pump laser 902. The driving current controller 911 is a controller or circuit for controlling a driving current of the pump laser 902 to be increased or decreased according to a given control scheme on the basis of an electric signal (light amount information) output from the optical detector 910.

The coupler 912 is an optical element that demultiplexes a part of the pump light in order to detect the intensity of the pump light immediately after being output from the pump laser 902. The optical detector 913 is an optical/electrical converter that detects the optical intensity (Raman gain) of the pump light. The pump power change calculator 914 is a functional unit or circuit that calculates a variation of the pump light intensity.

The optical fiber bending analyzer 915 is a functional unit or circuit for analyzing the degree of the fiber bending corresponding to information acquired by the loss calculator 909 and the pump power change calculator 914 with reference to the lookup table 918.

The pump laser controller 916 is a controller or circuit for controlling the pump light intensity of the pump light from the pump laser according to the degree of the fiber bending analyzed by the optical fiber bending analyzer 915. Incidentally, a signal for controlling the intensity of the pump light is output to the pump laser 902 from the optical fiber bending analyzer 915 through the control line 917. The lookup table 918 is configured by a table having a data structure illustrated in FIG. 16. In this example, rows in FIG. 16 represent pump powers.

In this example, an auto gain control (AGC) system or an auto level control (ALC) system is preferably used as a system for controlling the driving current of the pump laser 902. In the simplest control mode of the auto gain control, the driving current value of the pump laser 902 is changed so that the Raman gain monitored by the optical detector 910 becomes a set value.

On the other hand, in the simplest control mode of the auto level control, the driving current value of the pump laser 902 is changed so that the optical intensity of the optical main signal observed by the optical detector 910 becomes a set value.

Figure 11:
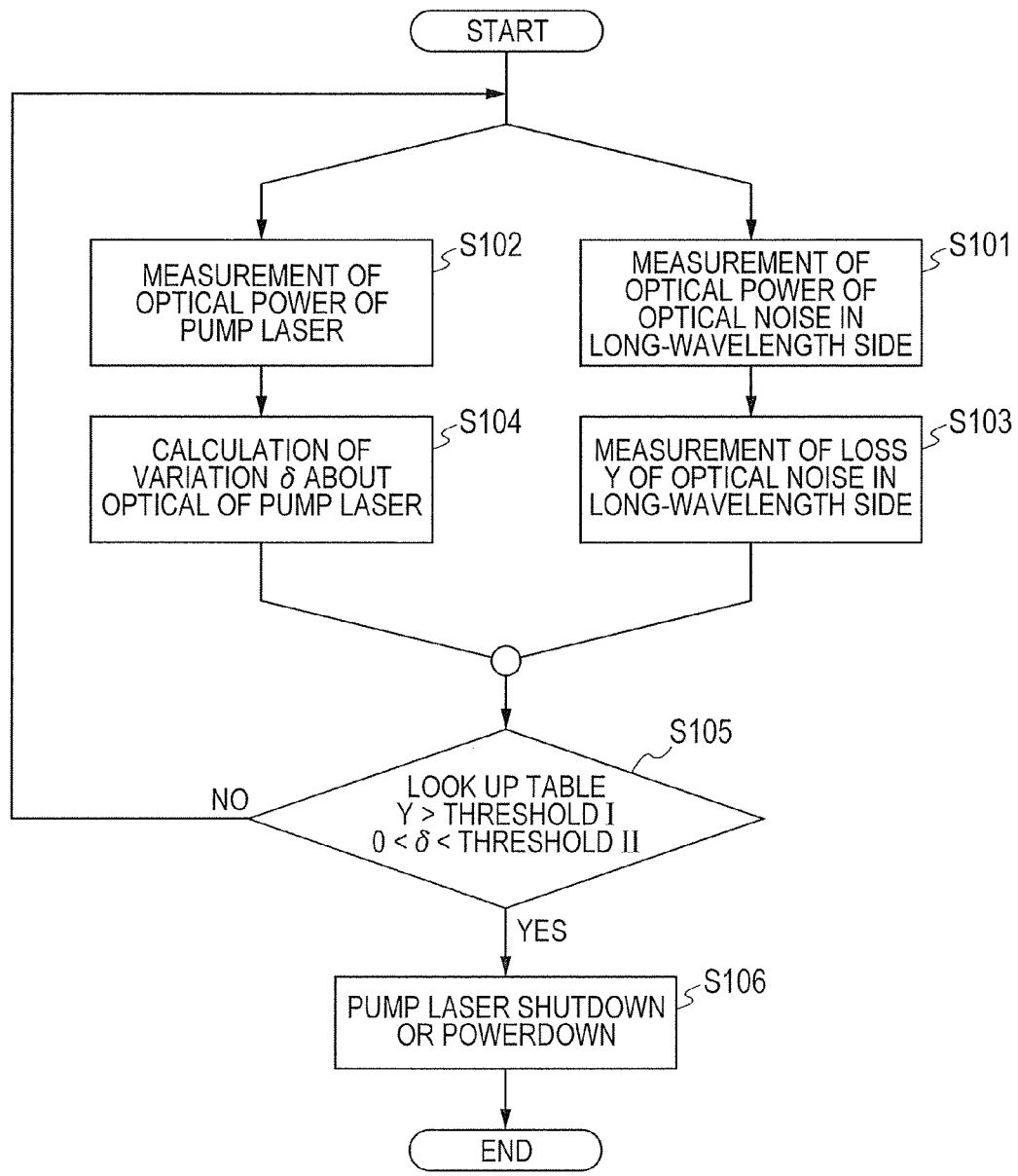
FIG. 11 is a diagram illustrating a flowchart used in the fourth embodiment.

Hereinafter, a description will be given of the detection of the fiber bending and the shutdown or powerdown control of the pump laser by the optical Raman amplifier module 900 (FIG. 10) with reference to a flowchart of FIG. 11. The operation of the flowchart is conducted by the optical Raman amplifier module 900. The optical Raman amplifier module 900 always executes the processing of FIG. 11.

In this embodiment, the information on the Raman gain is directly monitored as a change in the pump light power output from the pump laser 902. That is, a change of the upstream pump light power multiplexed into the optical fiber transmission line 901 is monitored by the aid of the optical detector 913 and the pump power change calculator 914. In the above-mentioned control system (AGC, ALC), when the optical loss occurs due to the fiber bending, the driving current value of the pump laser 902 is controlled to be increased so as to eliminate the optical loss. Under the circumstances, in this embodiment, an increase in the power of the pump light output from the pump laser 902 is monitored.

However, the control attributable to the increase in the pump light power may be caused by the fiber bending and other factors such as deterioration with time. Under the circumstances, the optical fiber bending analyzer 915 monitors the magnitude of the optical loss of the optical noise in the long wavelength side while monitoring the pump power. Therefore, when the increase in the pump light power is detected, and the magnitude of the optical loss of the optical noise in the long wavelength side is a threshold value (threshold value I) or more, the optical fiber bending analyzer 915 determines that the fiber is bent. On the contrary, even when the increase in the pump light power is detected, if the optical loss is the threshold value I or lower, the optical fiber bending analyzer 915 determines that the Raman gain is reduced due to another factor such as the deterioration of the pump laser 902 with time.

Under the circumstances, the optical Raman amplifier module 900 (optical fiber bending analyzer 915) measures the loss of optical noise in the long wavelength side in Step S101, and monitors the optical intensity of the pump light output from the pump laser 902 in Step S102 at the same time.

In subsequent Step S103, the optical Raman amplifier module 900 calculates the loss of the optical noise in the long wavelength side by the loss calculator 909. At the same time, in Step S104, the optical Raman amplifier module 900 calculates a variation of the pump light intensity monitored in Step S102 by the aid of the pump power change calculator 914.

Thereafter, information on the loss (S103) and a variation of the pump light intensity (S104) are transmitted to the optical fiber bending analyzer 915. In Step S105, the optical fiber bending analyzer 915 determines the radius of curvature corresponding to the information on the loss and the variation of the pump power with reference to the lookup table 918 (FIG. 16). In FIG. 16, rows represent variations 5 of the pump power, and columns represent the losses Y.

In this example, the optical fiber bending analyzer 915 determines that the radius of curvature of the optical fiber exceeds a predetermined threshold value if the loss exceeds the predetermined threshold value I, and the variation of the pump light intensity is a value between 0 and the threshold value II. In this case, the optical fiber bending analyzer 915 is advanced to processing of Step S106. On the contrary, if any one value does not exceed the threshold value, the optical fiber bending analyzer 915 returns to a start of the flowchart, and repeats processing of Steps S101 to S105. If the variation of the pump light intensity exceeds the threshold value II, it is conceivable that a cause other than the loss caused by the fiber bending occurs.

In Step S106, the pump laser controller 916 controls the pump laser 902 through the control line 917, and controls shutdown of the occurrence of the pump light or powerdown of the optical intensity. In this embodiment, a relationship of the loss information in the long wavelength side, the variation of the pump power of the pump laser, and the radius of curvature of the optical fiber is detected on the basis of the lookup table of FIG. 16. However, another lookup table may be used to shut down or power down the pump laser.

As described above, even in this embodiment, the same advantages as those in the second embodiment can be realized.

5. Fifth Embodiment

In a fifth embodiment, a description will be given of a system in which the occurrence of the fiber bending is detected on the basis of the loss information on the optical noise in the long wavelength side appearing in the optical fiber which is a transmission line of the optical main signal, and the optical intensity information on a Rayleigh scattering light appearing on the optical fiber.

Figure 12:
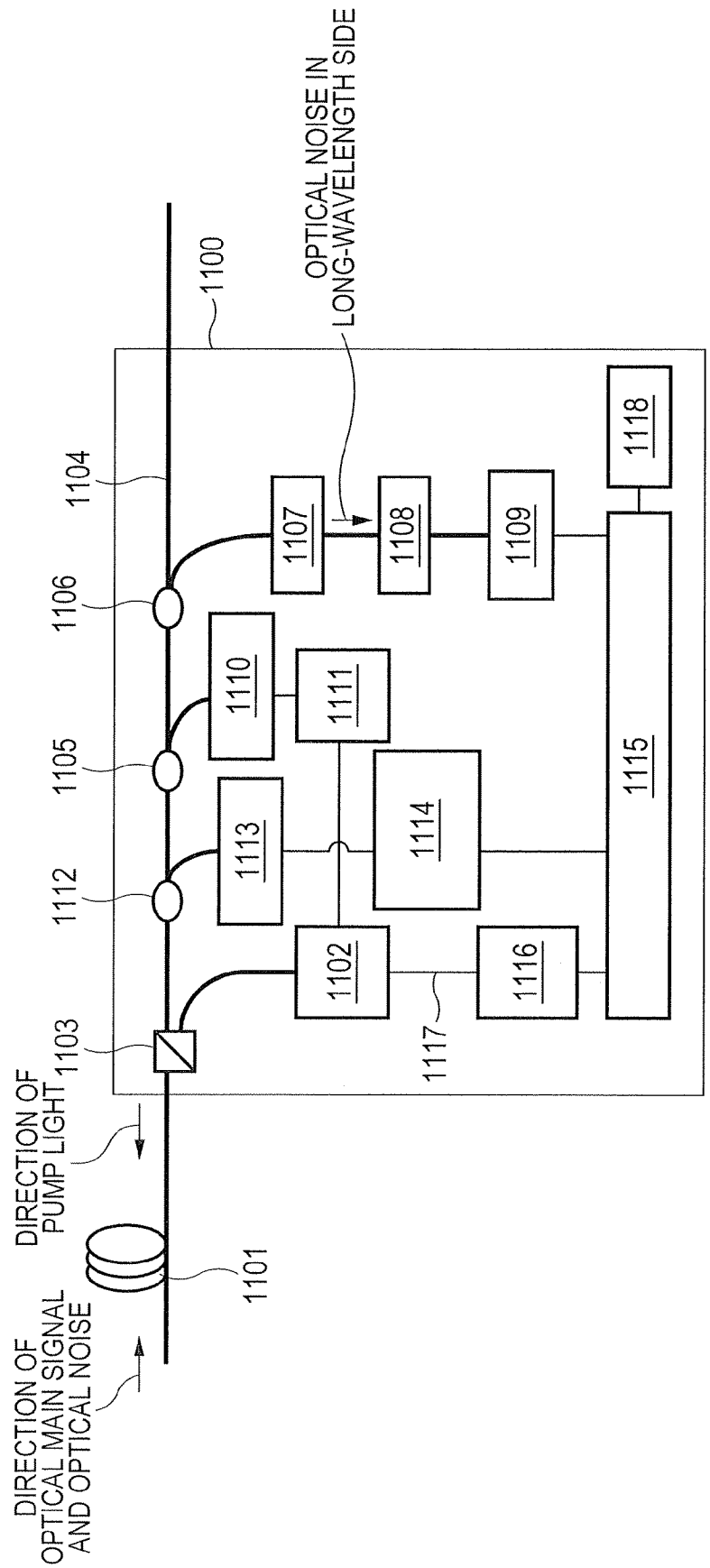
FIG. 12 is a configuration diagram of an optical transmission system according to a fifth embodiment.

FIG. 12 is a block diagram illustrating a configuration of an optical Raman amplifier module 1100 according to the fifth embodiment. In FIG. 12, the optical Raman amplifier module 1100 is disposed downstream of an optical fiber transmission line 1101 in an optical fiber communication system (backward pumping scheme). However, the optical Raman amplifier module 1100 may be disposed at the upstream side with respect to the optical fiber transmission line 1101, and may input the pump light toward the downstream side (forward pumping scheme). Also, the optical Raman amplifier module 1100 may be disposed at both of the upstream and downstream sides with respect to the optical fiber transmission line 1101 (bi-directional pumping scheme) Also, the optical Raman amplifier module 1100 and the optical fiber transmission line 1101 may be included within the optical transmission system.

The optical Raman amplifier module 1100 includes a pump laser 1102, an optical multiplexer 1103, an optical fiber 1104, couplers 1105 and 1106, an optical filter 1107, an optical receiver 1108, a loss calculator 1109, an optical detector 1110, a driving current controller 1111, a coupler 1112, an optical detector 1113, a Rayleigh optical power change calculator 1114, an optical fiber bending analyzer 1115, a pump laser controller 1116, a control line 1117, and a lookup table 1118 therein.

In this example, the pump laser 1102 generates the pump light for amplifying the main signal light that propagates in the optical fiber transmission line 1101, and outputs the pump light toward the upstream side of the optical fiber transmission line 1101. The optical multiplexer 1103 is an optical element that multiplexes the pump light output from the pump laser 1102 into the optical fiber transmission line 1101 through which the optical main signal for information communication is propagated.

The optical fiber 1104 is connected to the optical fiber transmission line 1101, through which the optical main signal and the ASE are propagated. The coupler 1105 is an optical element that demultiplexes a partial light from the optical fiber 1104. The coupler 1106 is an optical element that demultiplexes the ASE from the optical fiber 1104. The optical filter 1107 is an optical element for transmitting the optical noise in only the long wavelength side in order to detect the loss of the ASE in the long wavelength side. The optical receiver 1108 is an optical/electrical converter for measuring the loss of the optical noise in only the long wavelength side.

The loss calculator 1109 is a functional unit or circuit for calculating the loss of the optical noise in the long wavelength side. The optical detector 1110 is an optical/electrical converter that converts the light propagated in the optical fiber 1104 into an electric signal, for feedback control of the pump laser 1102. The driving current controller 1111 is a controller or circuit for controlling a driving current of the pump laser 1102 on the basis of an electric signal (optical information) output from the optical detector 1110.

The coupler 1112 is an optical element that demultiplexes a part of the Rayleigh scattering light from the optical fiber 1104 in order to detect the optical intensity of the backward scattering light caused by the Rayleigh scattering of the pump light. The optical detector 1113 is an optical/electrical converter that converts the Rayleigh scattering light into an electric signal (optical intensity). The Rayleigh optical power change calculator 1114 is a functional unit or circuit that calculates a variation of the output optical intensity of the Rayleigh scattering light.

The optical fiber bending analyzer 1115 is a functional unit or circuit for analyzing the degree of the fiber bending corresponding to information acquired by the loss calculator 1109 and the Rayleigh optical power change calculator 1114 with reference to the lookup table 1118.

The pump laser controller 1116 is a controller or circuit for controlling the pump light intensity from the pump laser according to the degree of the fiber bending analyzed by the optical fiber bending analyzer 1115. Incidentally, a control signal of the pump light intensity is output to the pump laser 1102 from the optical fiber bending analyzer 1115 through the control line 1117. The lookup table 1118 is configured by a table having a data structure illustrated in FIG. 16. In this example, rows in FIG. 16 represent the Rayleigh optical powers.

In this example, an auto gain control (AGC) system or an auto level control (ALC) system is preferably used as a system for controlling the driving current of the pump laser 1102. In the simplest control mode of the auto gain control, the driving current value of the pump laser 1102 is changed so that the Raman gain monitored by the optical detector 1110 becomes a set value.

On the other hand, in the simplest control mode of the auto level control, the driving current value of the pump laser 1102 is changed so that the optical intensity of the optical main signal observed by the optical detector 1110 becomes a set value.

Figure 13:
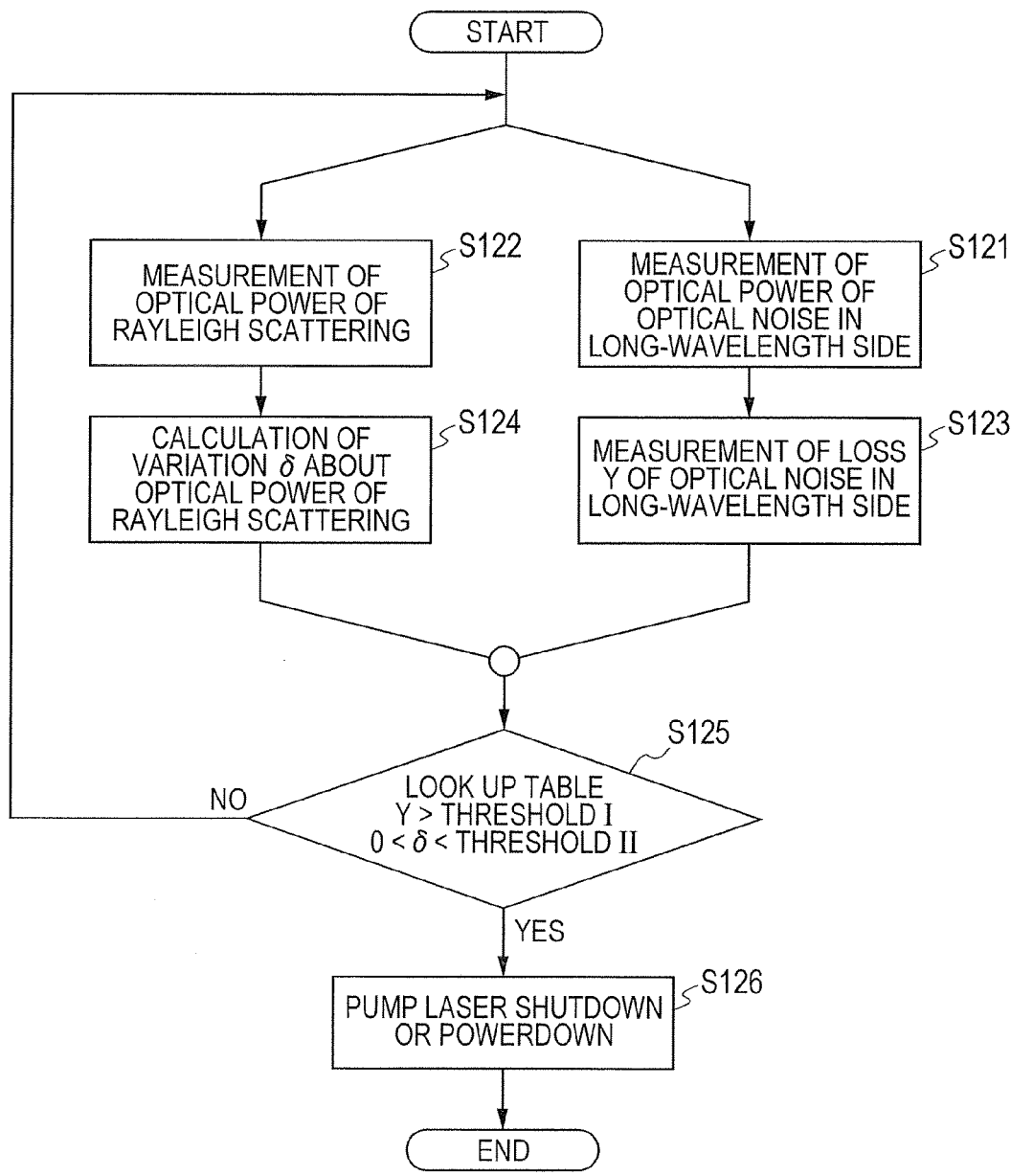
FIG. 13 is a diagram illustrating a flowchart used in the fifth embodiment.

Hereinafter, a description will be given of the detection of the fiber bending and the shutdown or powerdown control of the pump laser by the optical Raman amplifier module 1100 (FIG. 12) with reference to a flowchart of FIG. 13. The operation of the flowchart is conducted by the optical Raman amplifier module 1100. The optical Raman amplifier module 1100 always executes the processing of FIG. 13.

In this embodiment, the information on the Raman gain is monitored as a change of the backward scattering light generated by subjecting the pump light to Rayleigh scattering. The optical detector 1113 and the Rayleigh optical power change calculator 1114 are used for monitoring. When the above-mentioned control system (AGC, ALC) is used, if the optical loss occurs due to the fiber bending, the driving current value of the pump laser 1102 is controlled to be increased so as to eliminate the optical loss. When the driving current value is increased to increase the pump power, the power of the Rayleigh light is also increased together. As a result, the information on the Raman gain is acquired through a change in the power of the Rayleigh light (optical intensity of the backward scattering light).

However, the control attributable to the increase in the pump light power may be caused by the fiber bending and other factors such as deterioration with time. Under the circumstances, the optical fiber bending analyzer 1115 monitors the magnitude of the optical loss of the optical noise in the long wavelength side while monitoring the change in the power of the Rayleigh light. Therefore, when the increase in the power of the Rayleigh light is detected, and the magnitude of the optical loss of the optical noise in the long wavelength side is a threshold value (threshold value I) or more, the optical fiber bending analyzer 1115 determines that the fiber is bent. On the contrary, even when the increase in the power of the Rayleigh light is detected, if the optical loss is the threshold value I or lower, the optical fiber bending analyzer 1115 determines that the Raman gain is reduced due to another factor such as the deterioration of the pump laser 1102 with time.

Under the circumstances, the optical Raman amplifier module 1100 (optical fiber bending analyzer 1115) measures the loss of optical noise in the long wavelength side in Step S121, and monitors the Rayleigh scattering optical intensity of the pump light in Step S122 at the same time.

In subsequent Step S123, the optical Raman amplifier module 1100 calculates the loss of the optical noise in the long wavelength side by the loss calculator 1109. At the same time, in Step S124, the optical Raman amplifier module 1100 calculates a variation of the Rayleigh scattering optical intensity monitored in Step S122 by the aid of the Rayleigh optical power change calculator 1114.

Thereafter, information on the loss (S103) and a variation of the Rayleigh optical power (S124) are transmitted to the optical fiber bending analyzer 1115. In Step S125, the optical fiber bending analyzer 1115 determines the radius of curvature corresponding to the information on the loss and the variation of the Rayleigh optical power with reference to the lookup table 1118 (FIG. 16). In FIG. 16, rows represent variations δ of the Rayleigh optical power, and columns represent the losses Y.

In this example, the optical fiber bending analyzer 1115 determines that the radius of curvature of the optical fiber exceeds a predetermined threshold value, for example, if the loss exceeds the predetermined threshold value I, and the variation of the Rayleigh optical power is a value between 0 and the threshold value II (range surrounded by a bold line in FIG. 16). In this case, the optical fiber bending analyzer 1115 is advanced to processing of Step S126. On the contrary, for example, if the loss does not exceed the predetermined threshold value I, the optical fiber bending analyzer 1115 returns to a start of the flowchart, and repeats processing of Steps S121 to S125.

If the variation of the Rayleigh optical power exceeds the threshold value II, it is conceivable that the loss of the light of the long wavelength band occurs due to a cause other than the loss caused by the fiber bending. In Step S126, the pump laser controller 1116 controls the output optical intensity of the pump light from the pump laser 1102 through the control line 1117, and shuts down or powers down the output of the pump light. In this embodiment, a relationship of the loss information in the long wavelength side, the variation of the Rayleigh optical power, and the radius of curvature of the optical fiber is detected on the basis of the lookup table of FIG. 16. However, another lookup table may be used to shut down or power down the pump laser.

As described above, similarly, according to this embodiment, the same advantages as those in the second embodiment can be realized.

6. Sixth Embodiment

In a sixth embodiment, a description will be given of a system in which the optical noise in the long wavelength side and the optical noise in the short wavelength side which appear in the optical fiber which is a transmission line of the optical main signal are synchronously detected, and the occurrence of the fiber bending is detected on the basis of a loss difference therebetween. Incidentally, the above-mentioned second embodiment (FIG. 6) is a system example in which those optical noises are asynchronously detected.

Figure 14:
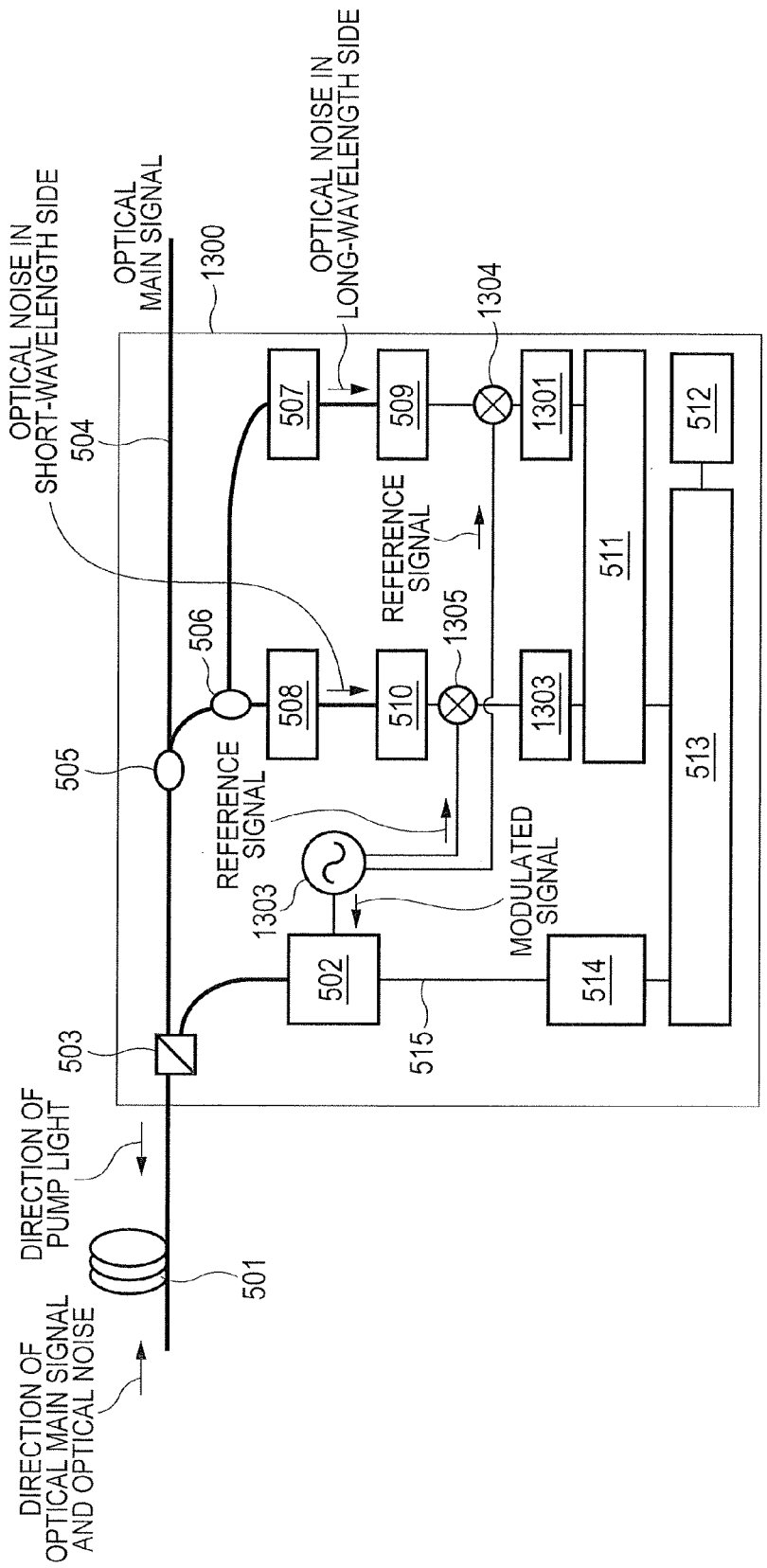
FIG. 14 is a configuration diagram of an optical transmission system according to a sixth embodiment.

FIG. 14 illustrates a block configuration of an optical Raman amplifier module 1300 according to a sixth embodiment. In FIG. 14, parts corresponding to those in FIG. 6 are denoted by identical symbols. In FIG. 14, the optical Raman amplifier module 1300 is disposed downstream of the optical fiber transmission line 501 configuring the optical fiber communication system (backward pumping scheme). However, the optical Raman amplifier module 1300 may be disposed at the upstream side with respect to the optical fiber transmission line 501, and may input the pump light toward the downstream side (forward pumping scheme). Also, the optical Raman amplifier module 1300 may be disposed at both of the upstream and downstream sides with respect to the optical fiber transmission line 501 (bi-directional pumping scheme). Also, the optical Raman amplifier module 1300 and the optical fiber transmission line 501 may be included within the optical transmission system.

The optical Raman amplifier module 1300 includes a pump laser 502, an optical multiplexer 503, an optical fiber 504, couplers 505 and 506, optical filters 507 and 508, optical receivers 509 and 510, low-pass filters 1301 and 1302, a loss difference calculator 511, a lookup table 512, a frequency generator 1303, an optical fiber bending analyzer 513, a pump laser controller 514, a control line 515, and multipliers 1304 and 1305 therein.

Among those components, constituent parts specific to the optical Raman amplifier module 1300 employing the synchronous detection system are five parts including the low-pass filters 1301 and 1302, the frequency generator 1303, and the multipliers 1304 and 1305.

In the synchronous detection system, a modulation signal having a given frequency is generated by the frequency generator 1303, and a driving current is modulated in frequency by the aid of the modulation signal. The driving current that has been modulated in frequency is used as a driving signal of the pump laser 502. As a result, a frequency modulation component is superimposed on the optical noise of the optical Raman. On the other hand, the frequency generator 1303 supplies the above-mentioned modulation signal to the multipliers 1304 and 1305 connected to outputs of the optical receivers 509 and 510 as a reference signal for synchronous detection.

As illustrated in FIG. 14, the multiplier 1304 corresponds to the optical receiver 509, and the multiplier 1305 corresponds to the optical receiver 510. Accordingly, the multiplier 1304 outputs a signal obtained by mixing (that is, synchronously detecting) an electric signal corresponding to the optical noise in the long wavelength side with the reference signal to the low-pass filter 1301. On the other hand, the multiplier 1305 outputs a signal obtained by mixing (that is, synchronously detecting) an electric signal corresponding to the optical noise in the short wavelength side with the reference signal to the low-pass filter 1302.

The low-pass filters 1301 and 1302 remove unnecessary high frequency components (the same frequency component as the frequency modulation wave and a frequency component twice as high as the frequency modulation wave) generated during synchronous detection from multiplication outputs. In this situation, the signal intensity that has passed through the low-pass filters 1301 and 1302 is represented by m×A×B. Reference symbol m is a modulation degree of the frequency, A is a reception intensity of the Raman optical noise in the optical receiver 509 or 590, and B is amplitude of the reference signal.

As understood from the above relational expression, when the amplitude B of the reference signal is increased, the signal amplitude input to the loss difference calculator 511 can be increased, and the measurement sensitivity can be enhanced. The synchronous detection system is not limited to the configuration illustrated in FIG. 14, but may be another synchronous detection system. The processing operation of the optical Raman amplifier module 1300 is conducted according to the flowchart (FIG. 7) of the second embodiment.

In this embodiment, the same advantages as those in the second embodiment can be realized with higher precision.

7. Seventh Embodiment

In a seventh embodiment, a description will be given of an example in which a function for detecting the occurrence of the fiber bending is installed in an optical line terminal (OLT) devices that receives a plurality of optical network unit (ONU) devices by using a coupler. In the following description, a system in which the plurality of optical network unit devices is accommodated in the optical line terminal device by using a passive element is called "PON (passive optical network) system".

Figure 17:
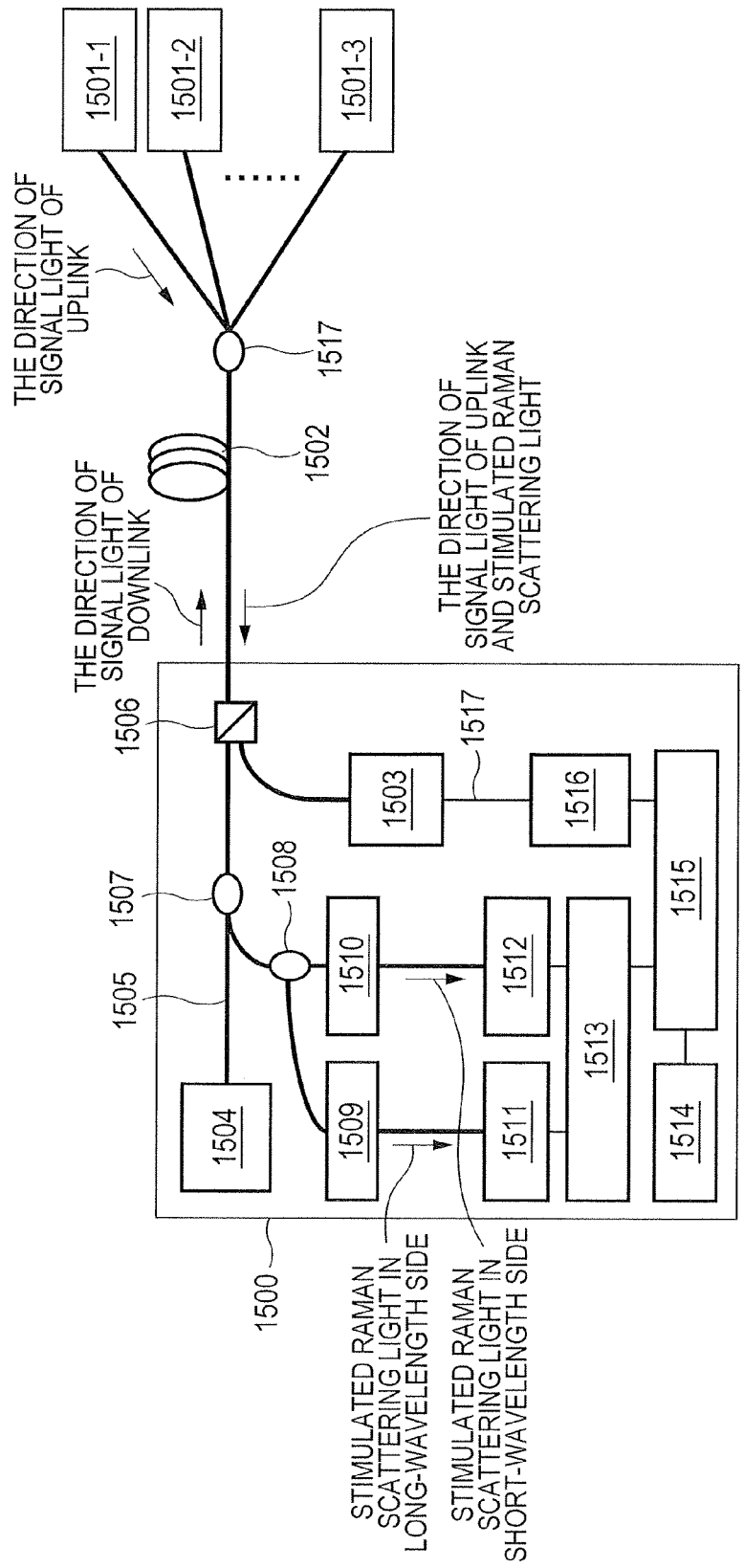
FIG. 17 is a configuration diagram of an optical transmission system according to a seventh embodiment.

FIG. 17 illustrates a block configuration of a PON system according to a seventh embodiment. In the PON system illustrated in FIG. 17, three ONU devices 1501-1 to 1501-3 are connected to one OLT device 1500. The number of ONU devices may be arbitrary. Also, the number of OLT devices 1500 may be also arbitrary.

The OLT device 1500 includes a transmitter 1503, a receiver 1504, an optical fiber 1505, a multiplexer/demultiplexer 1506, couplers 1507 and 1508, optical filters 1509 and 1510, receivers 1511 and 1512, a loss difference calculator 1513, a lookup table 1514, a fiber bending analyzer 1515, a transmitter controller 1516, and a control line 1517.

In this example, the transmitter 1503 is a device that transmits a downlink signal to the ONU devices 1501-1 to 1501-3. The receiver 1504 is a device that receives an uplink signal output from the ONU devices 1501-1 to 1501-3. The optical fiber 1505 is used for propagation of the optical signal within the OLT device 1500.

The multiplexer/demultiplexer 1506 is a device that multiplexes a downlink signal light output from the transmitter 1503 into an optical fiber transmission line 1502, and demultiplexes the stimulated Raman scattering light (ASE) generated by the downlink signal light and the uplink signal lights from the ONU devices 1501-1 to 1501-3 from the optical fiber transmission line 1502. In this configuration example, a light source within the transmitter 1503 functions as a pump laser.

The coupler 1507 is an optical element that demultiplexes the stimulated Raman scattering light from the optical fiber 1505. The coupler 1508 is an optical element that demultiplexes the light demultiplexed by the coupler 1507 into the stimulated Raman scattering light in the long wavelength side and the stimulated Raman scattering light in the short wavelength side. The optical filter 1509 is an optical element that transmits only the stimulated Raman scattering light in the long wavelength side. The optical filter 1510 is an optical element that transmits only the stimulated Raman scattering light in the short wavelength side.

The receiver 1511 is an optical/electrical converter used for measuring the optical intensity or loss of the stimulated Raman scattering light in the long wavelength side. The receiver 1512 is an optical/electrical converter used for measuring the optical intensity or loss of the stimulated Raman scattering light in the short wavelength side.

The loss difference calculator 1513 is a functional unit or circuit for calculating an optical intensity difference or a loss difference between the optical noise in the long wavelength side and the optical noise in the short wavelength side. The lookup table 1514 is a storage area that stores a relationship between the optical intensity difference or the loss difference and the radius of curvature for each kind of the optical fibers therein. For example, a table of a data structure illustrated in FIG. 15 is used.

The fiber bending analyzer 1515 determines the radius of curvature of the optical fiber corresponding to the present measurement result with reference to the lookup table 1514 by using the calculated optical intensity difference or loss difference. The transmitter controller 1516 controls an output of the downlink signal light output from the transmitter 1503 on the basis of the determined radius of curvature. More specifically, the transmitter controller 1516 controls an optical output of a light source (not shown) configuring the transmitter 1503 to be shut down or powered down.

The processing operation of the OLT device 1500 is conducted basically according to the flowchart (FIG. 7) of the second embodiment. However, a light source to be controlled is not the pump laser but a light source within the transmitter 1503.

The transmitter 1503 may transmits a wavelength multiplex signal. Also, in the system configuration of FIG. 17, the information on the Raman gain is acquired by the same manner as that in the second embodiment (the optical intensity difference or the loss difference between the stimulated Raman scattering light appearing in the long wavelength side and the stimulated Raman scattering light appearing in the short wavelength side). However, the present invention is not limited to this configuration. For example, as in the third, fourth, and fifth embodiments, the downlink signal light output from the transmitter 1503 may be monitored, a current value for driving the transmitter 1503 may be monitored, or the backward scattering light caused by the Rayleigh scattering of the downlink signal light may be monitored. Also, as in the sixth embodiment, the synchronous detection system may be applied.

According to this embodiment, even in the OLT device 1500 accommodating a large number of ONU devices therein, the occurrence of the bending of the optical fiber can be autonomously detected to realize the shutdown or power-down of the output of the optical signal from the transmission light source on the basis of the detection result.

8. Other Embodiments

The respective embodiments of the present invention have been described above. However, the present invention includes various modified examples without departing from the subject matter of the present invention. For example, in the above-mentioned embodiments, in order to easily understand the present invention, the specific configurations are described. However, the present invention does not always provide all of the configurations described above.

Also, a part of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

What is claimed is:

1. An optical communication module that outputs a continuous wave light generated by at least one light source to an optical fiber transmission line, the optical communication module comprising:
    a loss measurement unit that measures a loss of an amplified spontaneous emission that is generated by allowing the continuous wave light output from the light source to create stimulated Raman scattering in the optical fiber transmission line, and propagated in a direction opposite to that of the continuous wave light within the optical fiber transmission line;
    a fiber abnormality analyzer that detects an abnormal state of the optical fiber transmission line on the basis of loss information on the amplified spontaneous emission measured by the loss measurement unit; and
    a light source controller that controls a supply state of the continuous wave light from the light source on the basis of the detection of the fiber abnormality analyzer.

2. The optical communication module according to claim 1, further comprising: a gain measurement unit that acquires Raman gain information on the light source which outputs the continuous wave light,
    wherein the fiber abnormality analyzer detects the abnormal state of the optical fiber transmission line on the basis of the loss information and the Raman gain information.

3. The optical communication module according to claim 2,
    wherein the gain measurement unit acquires the Raman gain information due to a loss of the amplified spontaneous emission in a shorter wavelength side than a wavelength band of the amplified spontaneous emission measured in the loss measurement unit.

4. The optical communication module according to claim 2,
    wherein the gain measurement unit acquires the Raman gain information through an on/off gain acquired by measuring the loss of a light of a wavelength band of an optical main signal for optical communication.

5. The optical communication module according to claim 2, further comprising:
    a light source driving controller that controls the light source according to a given driving system; and
    a light source information detector that detects state information on the light source,
    wherein the gain measurement unit acquires the state information on the light source which is detected by the light source information detector as the Raman gain information.

6. The optical communication module according to claim 5,
    wherein the state information on the light source which is detected by the light source information detector is a driving current for driving the light source.

7. The optical communication module according to claim 5,
    wherein the state information on the light source which is detected by the light source information detector is an optical intensity of the continuous wave light generated by the light source.

8. The optical communication module according to claim 5,
    wherein the state information on the light source which is detected by the light source information detector is an optical intensity of a backward scattering light generated by allowing the continuous wave light generated by the light source to be Rayleigh-scattered in the optical fiber transmission line.

9. The optical communication module according to claim 5,
    wherein the light source driving controller controls the light source according to an auto gain control system.

10. The optical communication module according to claim 5,
    wherein the light source driving controller controls the light source according to an auto level control system.

11. The optical communication module according to claim 1,
    wherein the optical communication module is an optical Raman amplifier module intended to amplify an optical main signal in the optical communication, and
    wherein the continuous wave light output from the light source is a pump light intended to create the stimulated Raman scattering.

12. The optical communication module according to claim 1,
    wherein the optical communication module is an OLT optical transmission module of a PON system, and
    wherein the continuous wave light output from the light source is a main signal for information communication.

13. The optical communication module according to claim 1,
    wherein the abnormal state of the optical fiber transmission line is bending of the optical fiber.

14. The optical communication module according to claim 1,
    wherein the abnormal state of the optical fiber transmission line is connector disconnection of the optical fiber.

15. The optical communication module according to claim 1,
    wherein the abnormal state of the optical fiber transmission line is an optical fiber breakage.

16. The optical communication module according to claim 1, further comprising:
    a frequency generator that generates a frequency signal having a given frequency component; and a frequency signal superimposing unit that superimposes the frequency signal generated by the frequency generator on a driving current of the light source, wherein the loss measurement unit acquires the loss information by synchronously detecting the amplified spontaneous emission with the frequency signal generated by the frequency generator as a reference signal.

17. An optical fiber communication system having an optical fiber transmission line, an optical communication module that is disposed at an upstream side with respect to the optical fiber transmission line, and an optical communication module that is disposed at a downstream side with respect to the optical fiber transmission line, wherein the optical communication module disposed at the downstream side comprises:

a loss measurement unit that measures a loss of an amplified spontaneous emission that is generated by allowing a continuous wave light output from at least one light source to create stimulated Raman scattering in the optical fiber transmission line, and propagated in a direction opposite to that of the continuous wave light within the optical fiber transmission line;

a fiber abnormality analyzer that detects an abnormal state of the optical fiber transmission line on the basis of loss information on the amplified spontaneous emission measured by the loss measurement unit; and a light source controller that controls a supply state of the continuous wave light from the light source on the basis of the detection of the fiber abnormality analyzer.

18. An optical fiber communication system having an optical fiber transmission line, an optical communication module that is disposed at an upstream side with respect to the optical fiber transmission line, and an optical communication module that is disposed at a downstream side with respect to the optical fiber transmission line, wherein the optical communication module disposed at the upstream side comprises:

a loss measurement unit that measures a loss of an amplified spontaneous emission that is generated by allowing a continuous wave light output from at least one light source to create stimulated Raman scattering in the optical fiber transmission line, and propagated in the same direction as that of the continuous wave light within the optical fiber transmission line;

a fiber abnormality analyzer that detects an abnormal state of the optical fiber transmission line on the basis of loss information on the amplified spontaneous emission measured by the loss measurement unit; and a light source controller that controls a supply state of the continuous wave light from the light source on the basis of the detection of the fiber abnormality analyzer.

19. An optical fiber communication system having an optical fiber transmission line, an optical communication module that is disposed at an upstream side with respect to the optical fiber transmission line, and an optical communication module that is disposed at a downstream side with respect to the optical fiber transmission line, wherein the optical communication module disposed at the downstream side comprises:

a loss measurement unit that measures a loss of an amplified spontaneous emission that is generated by allowing a continuous wave light output from at least one light source to create stimulated Raman scattering in the optical fiber transmission line, and propagated in a direction opposite to that of the continuous wave light within the optical fiber transmission line;

a fiber abnormality analyzer that detects an abnormal state of the optical fiber transmission line on the basis of loss information on the amplified spontaneous emission measured by the loss measurement unit; and a light source controller that controls a supply state of the continuous wave light from the light source on the basis of the detection of the fiber abnormality analyzer, and wherein the optical communication module disposed at the upstream side comprises:

a loss measurement unit that measures a loss of an amplified spontaneous emission that is generated by allowing a continuous wave light output from at least one light source to create stimulated Raman scattering in the optical fiber transmission line, and propagated in the same direction as that of the continuous wave light within the optical fiber transmission line;

a fiber abnormality analyzer that detects an abnormal state of the optical fiber transmission line on the basis of loss information on the amplified spontaneous emission measured by the loss measurement unit; and a light source controller that controls a supply state of the continuous wave light from the light source on the basis of the detection of the fiber abnormality analyzer.

* * * * *